United States Patent
Tsuru

(10) Patent No.: US 10,747,561 B2
(45) Date of Patent: Aug. 18, 2020

(54) LOG MANAGEMENT DEVICE AND LOG MANAGEMENT METHOD

(71) Applicant: FUJITSU LIMITED, Kawasaki-shi, Kanagawa (JP)

(72) Inventor: Takeshi Tsuru, Tachikawa (JP)

(73) Assignee: FUJITSU LIMITED, Kawasaki (JP)

( * ) Notice: Subject to any disclaimer, the term of this patent is extended or adjusted under 35 U.S.C. 154(b) by 150 days.

(21) Appl. No.: 16/149,171

(22) Filed: Oct. 2, 2018

(65) Prior Publication Data
US 2019/0102210 A1    Apr. 4, 2019

(30) Foreign Application Priority Data

Oct. 4, 2017    (JP) .................................. 2017-194226

(51) Int. Cl.
| | |
|---|---|
| *G06F 9/455* | (2018.01) |
| *G06F 11/34* | (2006.01) |
| *G06F 11/30* | (2006.01) |
| *G06F 9/445* | (2018.01) |

(52) U.S. Cl.
CPC ...... *G06F 9/45533* (2013.01); *G06F 9/45558* (2013.01); *G06F 11/301* (2013.01); *G06F 11/3476* (2013.01); *G06F 9/44526* (2013.01); *G06F 2009/45583* (2013.01); *G06F 2009/45591* (2013.01)

(58) Field of Classification Search
CPC .................................................. G06F 9/45558
See application file for complete search history.

(56) References Cited

U.S. PATENT DOCUMENTS

| | | |
|---|---|---|
| 2012/0179646 A1 | 7/2012 | Hinton et al. |
| 2016/0315802 A1 | 10/2016 | Wei et al. |

FOREIGN PATENT DOCUMENTS

| | | |
|---|---|---|
| JP | 2014-502767 | 2/2014 |
| JP | 2017-503421 | 1/2017 |
| WO | 2012/094760 | 7/2012 |

*Primary Examiner* — Charlie Sun
(74) *Attorney, Agent, or Firm* — Fujitsu Patent Center

(57) ABSTRACT

A log management device includes one or more memories configured to store management information indicating each relationship between identification information of each virtual machine and identification information regarding each environment in which the each virtual machine operates, and one or more processor coupled to the one or memories and configured to, by referring to the management information, obtain a first log regarding a first environment operating a first virtual machine on the basis of identification information of the first virtual machine, perform generation of a second log in which specific information included in the first log is changed to a specific identifier regarding the first environment, and output the second log in response to receiving a request for a log regarding the first virtual machine.

19 Claims, 18 Drawing Sheets

FIG. 7

| VM NAME | NODE ID | DATE AND TIME | HV STATUS | HB LOG | HV STATUS | HB LOG |
|---|---|---|---|---|---|---|
| VM1 | 1234 | 2017/09/15 10:00:00 | warning | AA1.xml | error | AA2.xml |
| ... | ... | ... | ... | ... | ... | ... |

INTEGRATED LOG MANAGEMENT TABLE 151

FIG. 11

```
<?xml version="1.0" encoding="UTF-8"?>
<!DOCTYPE log SYSTEM "logger.dtd">
<log>
<record>
  <date>2017-08-31 12:15:15</date>
  <sequence>0002</sequence>
  ...
  <message>Fail to connect "192.168.0.21"...</message>
  ...
</record>
<record>
  ...
  <message>account "user0001" logon</message>
  ...
</record>
...
</log>
```
117

```
<?xml version="1.0" encoding="UTF-8"?>
<!DOCTYPE log SYSTEM "logger.dtd">
<log>
<record>
  <date>2017-08-31 12:15:15</date>
  <sequence>0002</sequence>
  ...
  <message>Fail to connect "3456"...</message>
  ...
</record>
<record>
  ...
  <message>account "1234" logon</message>
  ...
</record>
...
</log>
```
122

LOG MANAGEMENT DEVICE AND LOG MANAGEMENT METHOD

CROSS-REFERENCE TO RELATED APPLICATION

This application is based upon and claims the benefit of priority of the prior Japanese Patent Application No. 2017-194226, filed on Oct. 4, 2017, the entire contents of which are incorporated herein by reference.

FIELD

The embodiments discussed herein are related to a log management technology.

BACKGROUND

In a field of information processing, a virtualization technology is used which operates a plurality of virtual computers (which may be referred to as virtual machines or logic hosts) on a physical computer (which may be referred to as a physical machine or a physical host). Software such as an operating system (OS) or the like may be executed on each of the virtual machines. The physical machine using the virtualization technology executes software for managing the plurality of virtual machines. For example, software referred to as a hypervisor may allocate the processing power of a central processing unit (CPU) and the storage area of a random access memory (RAM) as computing resources to the plurality of virtual machines.

In operation of an information processing system, it is often that logs of software and hardware constituting the information processing system are obtained. The logs are used for checking of operation conditions, fault analysis, or the like by an administrator of the system or the like.

As an example, a device in a system providing a cloud-based service is proposed which aggregates and normalizes the log information of resources in a multi-tenant shared pool, and identifies a tenant related to a transaction by parsing the log information. For each of a set of transactions, this device provides a corresponding tenant and log data related to a particular transaction with an annotation indicating a tenant-specific identifier. This ensures that log data is appropriately related to a particular tenant/customer.

Incidentally, a device is also proposed which generates a fault notification message, and notifies the fault notification message to a fault subscription node, when the device receives a fault publishing message of a fault subscription node, and when fault information based on the fault publishing message is fault information to which the fault subscription node requests subscription.

Related technologies are disclosed in Japanese National Publication of International Patent Application No. 2014-502767 and Japanese National Publication of International Patent Application No. 2017-503421, for example.

SUMMARY

According to an aspect of the embodiments, a log management device includes one or more memories configured to store management information indicating each relationship between identification information of each virtual machine and identification information regarding each environment in which the each virtual machine operates, and one or more processor coupled to the one or memories and configured to, by referring to the management information, obtain a first log regarding a first environment operating a first virtual machine on the basis of identification information of the first virtual machine, perform generation of a second log in which specific information included in the first log is changed to a specific identifier regarding the first environment, and output the second log in response to receiving a request for a log regarding the first virtual machine.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating an example of an integrated log management table;

FIG. 11 is a diagram illustrating an example of conversion of a log file;

DESCRIPTION OF EMBODIMENTS

A system that provides a virtual machine usage environment to a plurality of tenants (multiple tenants) may limit logs that may be provided from a service provider operating the system to each tenant. For example, while each tenant is allowed to view a log of an OS on a virtual machine, each tenant is often not allowed to view a log of an environment such as a hypervisor operating the virtual machine and hardware (a physical machine, a network apparatus, and a storage or the like). This is because the log of the environment includes information that seriously affects the operation of the system when abused or misused.

From a standpoint of the tenant side, on the other hand, the limitation of the viewable log limits a range analyzable by log analysis on the tenant side. When an administrator on the tenant side investigates the cause of a fault, for example, the administrator may inquire of the service provider to check the conditions of the hypervisor and the hardware. However, the checking takes time, so that it may be difficult to deal with the fault promptly.

A present embodiment will hereinafter be described with reference to the drawings.

First Embodiment

Figure 1:
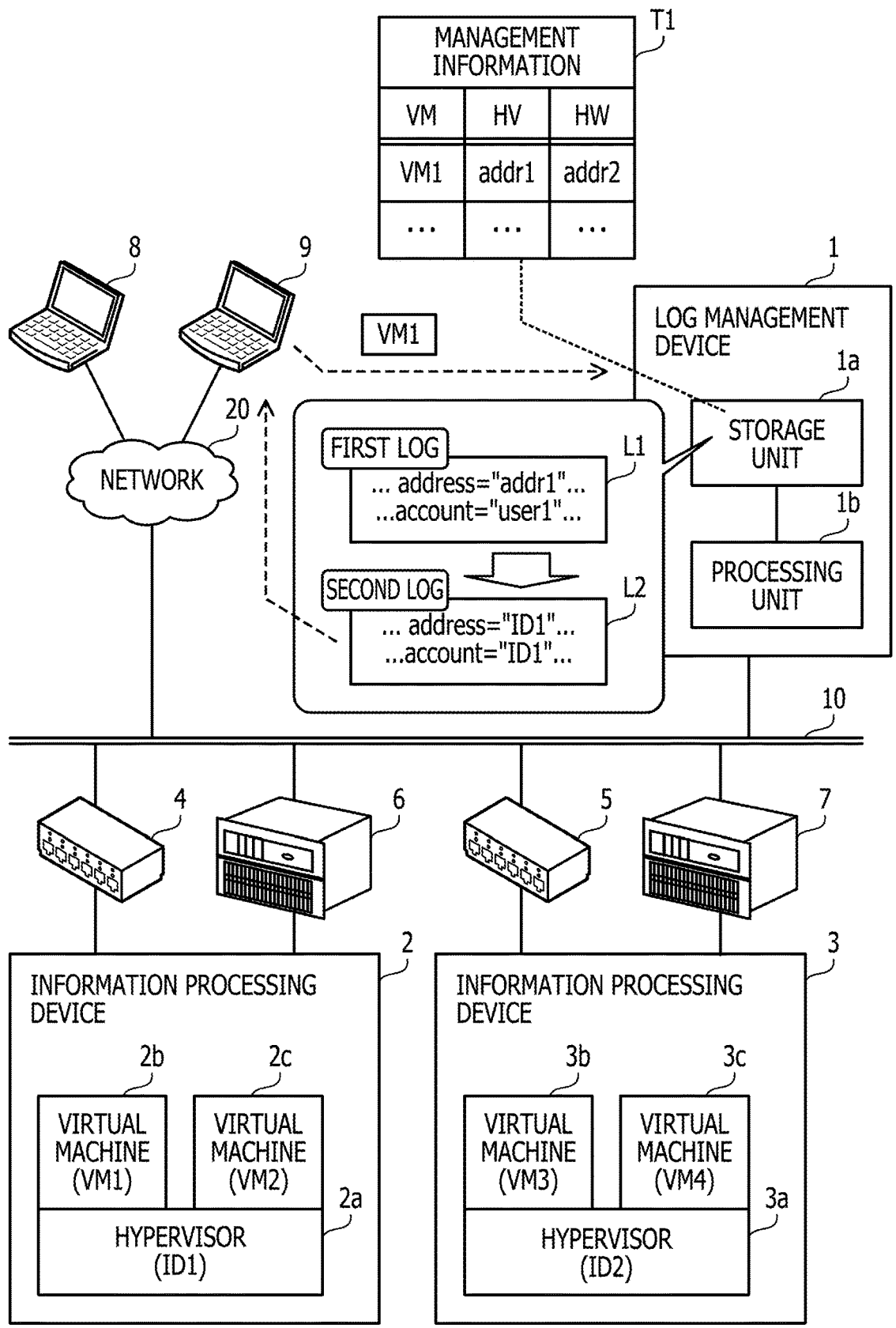
FIG. 1 is a diagram illustrating a log management device according to a first embodiment.

FIG. 1 is a diagram illustrating a log management device according to a first embodiment. An information processing system according to the first embodiment includes a log management device 1, information processing devices 2 and 3, switches 4 and 5, and storages 6 and 7. The log management device 1, the switches 4 and 5, and the storages 6 and 7 are coupled to a network 10. The information processing device 2 is coupled to the switch 4. The information processing device 2 is coupled to the network 10 via the switch 4. The information processing device 3 is coupled to the switch 5. The information processing device 3 is coupled to the network 10 via the switch 5. The information processing device 2 is coupled to the storage 6. The information processing device 3 is coupled to the storage 7. The information processing devices 2 and 3 may be directly coupled to the storages 6 and 7, or may be coupled to the storages 6 and 7 via a network such as a storage area network (SAN) or the like.

The information processing devices 2 and 3 each execute virtual machines, and render the virtual machines usable by terminal devices 8 and 9. Each of the information processing devices 2 and 3 may be referred to as a physical machine. The terminal devices 8 and 9 are coupled to a network 20. The network 20 is coupled to the network 10. The terminal devices 8 and 9 may use the virtual machines executed by the information processing devices 2 and 3 via the networks 10 and 20. Here, the terminal devices 8 and 9 are used by different users (tenants). For example, the information processing system according to the first embodiment is a system that provides a virtual machine usage environment to multiple tenants.

As an example, the information processing device 2 includes a hypervisor 2a and virtual machines 2b and 2c. The information processing device 3 includes a hypervisor 3a and virtual machines 3b and 3c. The hypervisor 2a allocates hardware resources such as a processor and a memory of the information processing device 2 and the storage 6 or the like to the virtual machines 2b and 2c. The hypervisor 3a allocates hardware resources such as a processor and a memory of the information processing device 3 and the storage 7 or the like to the virtual machines 3b and 3c.

As an example, the virtual machines 2b and 3b are allocated to the user of the terminal device 9. The virtual machines 2c and 3c are allocated to the user of the terminal device 8.

The log management device 1 makes it possible to provide the terminal devices 8 and 9 with logs of the hypervisors 2a and 3a related to the virtual machines 2b, 2c, 3b, and 3c and a log of hardware including the switches 4 and 5 and the storages 6 and 7. The log management device 1 includes a storage unit 1a and a processing unit 1b.

The storage unit 1a may be a volatile storage device such as a RAM or the like, or may be a nonvolatile storage device such as a hard disk drive (HDD), a flash memory, or the like. The processing unit 1b includes a CPU, a digital signal processor (DSP), an application specific integrated circuit (ASIC), a field programmable gate array (FPGA), or the like. The processing unit 1b may be a processor that executes a program. The processor may include a set of a plurality of processors (multiprocessor).

The storage unit 1a stores management information T1. The management information T1 is information indicating correspondence between the identification information of a virtual machine, the address of a hypervisor on a physical machine operating the virtual machine, and the address of hardware related to the physical machine. Incidentally, a virtual machine may be abbreviated to a virtual machine (VM), a hypervisor may be abbreviated to a hypervisor (HV), and hardware may be abbreviated to hardware (HW).

The identification information of the virtual machine is, for example, the identifier of the virtual machine, and selectable by a user using the virtual machine. The physical machine, for example, corresponds to the information processing device 2 operating the virtual machines 2b and 2c and the information processing device 3 operating the virtual machines 3b and 3c. Hardware related to the information processing device 2 may be hardware included in the information processing device 2, the switch 4, and the storage 6. In addition, hardware related to the information processing device 3 may be hardware included in the information processing device 3, the switch 5, and the storage 7. In a case where there are a plurality of pieces of hardware related to a certain physical machine, the addresses of the plurality of pieces of hardware may be registered for one virtual machine in the management information T1. The addresses are, for example, internet protocol (IP) addresses. The addresses may be other kinds of addresses such as media access control (MAC) addresses and the like.

Here, as an example, the identification information of the virtual machine 2b is "VM1." The identification information of the virtual machine 2c is "VM2." The identification information of the virtual machine 3b is "VM3." The identification information of the virtual machine 3c is "VM4." The address of the hypervisor 2a is "addr1." The address of hardware related to the information processing device 2 (for example, the storage 6) is "addr2." However, the respective addresses of a plurality of pieces of hardware (for example, the hardware included in the information processing device 2, the switch 4, and the storage 6) may be registered in the management information T1 in association with the identification information "VM1" of the virtual machine 2b.

When the identification information of a virtual machine is specified, the processing unit 1b obtains a first log related to a hypervisor and hardware based on the management information T1 stored in the storage unit 1a.

For example, the processing unit 1b receives a specification of the identification information "VM1" of the virtual machine 2b from the terminal device 9. Then, the processing unit 1b identifies the address of the hypervisor 2a operating the virtual machine 2b and the address of the hardware related to the information processing device 2 based on the management information T1. Further, the processing unit 1b obtains a log L1 regarding the hypervisor 2a and the corresponding hardware based on the identified addresses. The log L1 is an example of a first log.

For example, the log L1 may include information indicating histories of processing and states in the hypervisor 2a and the corresponding hardware. In addition, for example, the log L1 may include various setting information regarding an environment such as the address of the hypervisor 2a, the address of the corresponding hardware, an account for accessing an OS providing the hypervisor 2a, the account of the corresponding hardware, and the like.

The processing unit 1b generates a second log in which specific information included in the first log is replaced with a given node identifier of the hypervisor, and stores the second log in the storage unit 1a. The specific information is information that, when leaked to the outside and abused or misused, may affect the operation of the information processing system according to the first embodiment. The specific information is, for example, setting information regarding the environment, such as an address, an account, and the like.

Here, the node identifier is identification information uniquely given to the hypervisor. The node identifier may be retained by the hypervisor itself in advance, or may be given by another device such as the log management device 1 or the like. The node identifier is used mainly for a purpose of distinguishing the hypervisor. The node identifier is not used to control communication or the like as in the case of an address. In addition, the node identifier is not used for authentication to access the hypervisor or hardware as in the case of an account. Therefore, even when the node identifier becomes known to users using the terminal devices 8 and 9, the node identifier does not affect the operation of the system by being abused or misused.

For example, the log L1 includes the address "addr1" of the hypervisor 2a and the account "user1" of the OS providing the hypervisor 2a. Accordingly, the processing unit 1b replaces each of a part in which the address is described and a part in which the account is described with the node identifier "ID1" of the hypervisor 2a. A log L2 is an example of the second log generated by the replacement. The processing unit 1b stores the generated log L2 in the storage unit 1a.

The processing unit 1b outputs the second log stored in the storage unit 1a based on the node identifier.

For example, the processing unit 1b provides the terminal device 9 with the node identifier "ID1" of the hypervisor 2a for generation of a search query. When the processing unit 1b then receives a search query including the node identifier "ID1" from the terminal device 9, the processing unit 1b outputs the log L2 including the node identifier "ID1" to the terminal device 9.

Alternatively, the processing unit 1b may associate the log L2 with the node identifier "ID1" when storing the log L2 in the storage unit 1a. In that case, the processing unit 1b may search for the log L2 to be output to the terminal device 9 based on the association.

The log management device 1 may expand the range of the provided log without a leakage of the specific information. For example, provided contents may be enriched by expanding the range of the provided log. Alternatively, it may also be said that the limitation of the provided log may be alleviated. Specifics are as follows.

In a cloud-based service, each tenant is allowed to view a log of an OS on a virtual machine, but is often not allowed to view a log of the environment such as a hypervisor operating the virtual machine and hardware. This is because the log of the environment includes information that seriously affects the operation of the system when abused or misused. On the other hand, from a viewpoint of the tenant side, there is a possibility of being able to respond promptly at a time of a fault when the log regarding the environment may be checked.

Accordingly, the log management device 1 generates the second log (for example, the log L2) in which the specific information that is included in the first log (for example, the log L1) and may be a security problem is replaced with the node identifier of the hypervisor, and provides the second log to the terminal device 9. As described earlier, the node identifier is not information used for control within the system. Doing harm to the system by using the node identifier thus does not occur. Therefore, the log management device 1 may protect the specific information such as an address, an account, and the like of the environment from being leaked to external users by outputting, to the terminal device 9, the second log in which the specific information is converted into the node identifier. It is thus possible to provide a part of the log regarding the environment to the terminal device 9 while securing safety on the system side.

In addition, by only specifying the identification information of the virtual machine used by the user himself/ herself of the terminal device 9, the user of the terminal device 9 may obtain a part of the log of the hypervisor and the hardware related to the virtual machine. Therefore, in investigating a cause in a case of occurrence of a problem in operation of the virtual machine or the like, the user of the terminal device 9 may be provided with the log from the system side promptly. As a result, there is also an advantage in that an administrator on the tenant side may promptly perform work such as investigating the cause and dealing with a fault or the like.

It is to be noted that while in the above-described example, an example is mainly illustrated in which the specific information is replaced with the node identifier of the hypervisor, a method of the replacement is not limited to such an example. For example, the processing unit 1b may generate the second log by replacing the address and the account included in the log related to the hardware in the first log with the node identifier corresponding to the hardware.

For example, the specific information may include first setting information regarding the hypervisor and second setting information regarding the hardware. The processing unit 1b may generate the second log by replacing the first setting information in the first log with a first node identifier of the hypervisor, and replacing the second setting information in the first log with a second node identifier of the hardware. Here, as described earlier, an example of the first setting information is both or one of the address of the hypervisor and the account information used for access to the hypervisor. In addition, an example of the second setting information is both or one of the address of the hardware and the account information used for access to the hardware. Then, the hypervisor and the hardware may be distinguished from each other by the node identifiers, and the user may be assisted in analyzing the second log.

In addition, the storage unit 1a may store, in advance, correspondence between the address of the hypervisor (and the account of the OS) and the first node identifier of the hypervisor and correspondence between the address of the hardware (and the account of the hardware) and the second node identifier of the hardware. Alternatively, the processing unit 1b may obtain the first node identifier from the hypervisor, and store the first node identifier in the storage unit 1a in association with the address of the hypervisor. Similarly, the processing unit 1b may obtain the second node identifier from the hardware, and store the second node identifier in the storage unit 1a in association with the address of the hardware. Then, the processing unit 1b may generate the second log by referring to the storage unit 1a, and converting the information of the addresses and the accounts included in the first log into the node identifier of the hypervisor and the node identifier of the hardware.

In the following, functions of the log management device 1 will be described in further detail by illustrating a more concrete information processing system.

Second Embodiment

Figure 2:
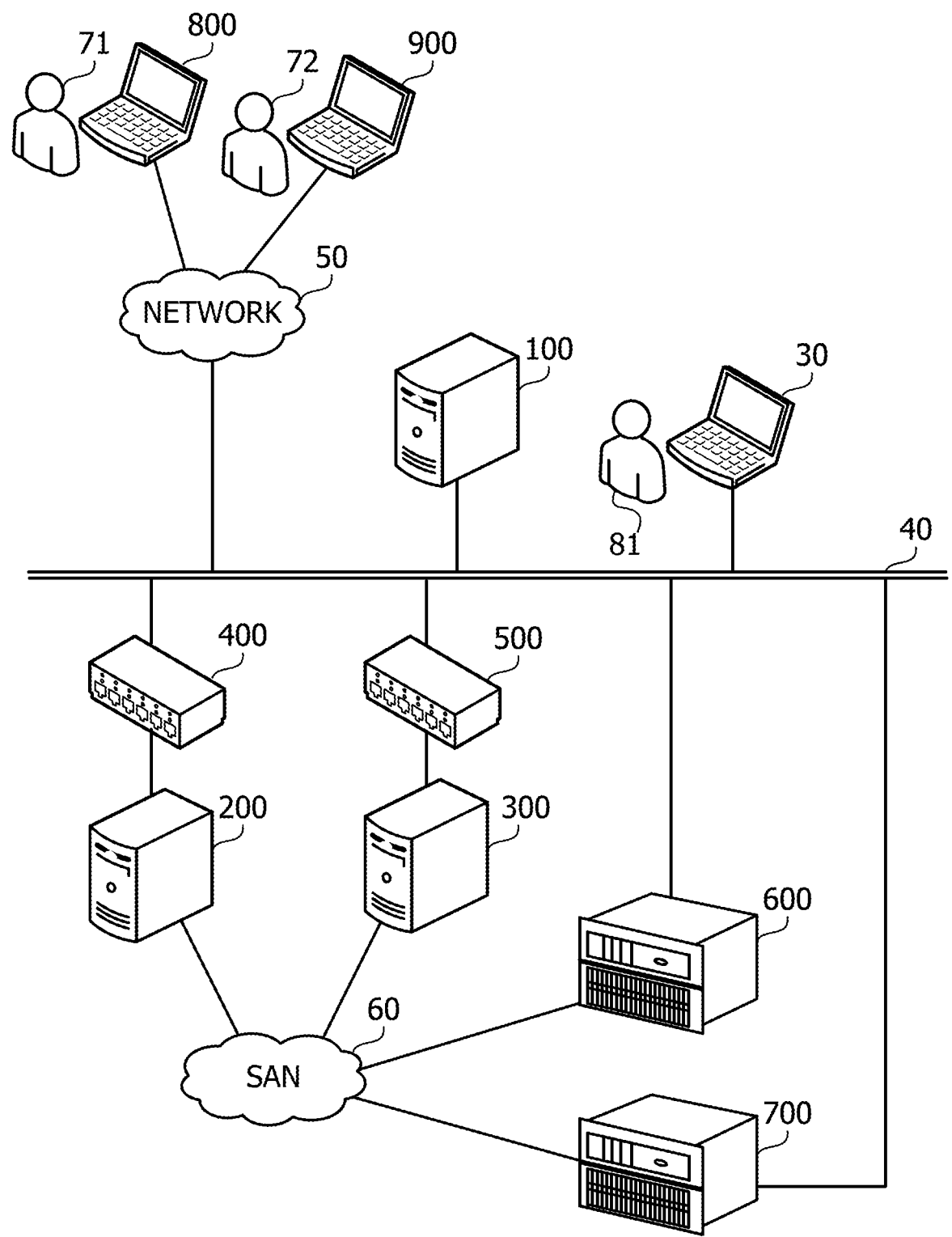
FIG. 2 is a diagram illustrating an example of an information processing system according to a second embodiment.

FIG. 2 is a diagram illustrating an example of an information processing system according to a second embodiment. The information processing system according to the second embodiment operates a plurality of virtual machines using computer resources, and renders each of the virtual machines usable by a plurality of users (for example, multiple tenants). Such a usage method of computers may be referred to as cloud computing.

The information processing system according to the second embodiment includes a management server 100, VM executing servers 200 and 300, switches 400 and 500, and storages 600 and 700. The management server 100, the switches 400 and 500, and the storages 600 and 700 are coupled to a network 40. The VM executing server 200 is coupled to the switch 400. The VM executing server 300 is coupled to the switch 500. The VM executing servers 200 and 300 may also be said to be coupled to the network 40 via the switches 400 and 500. The network 40 is, for example, a local area network (LAN) constructed within a data center. The VM executing servers 200 and 300 and the storages 600 and 700 are coupled to a SAN 60. The VM executing servers 200 and 300 may access the storages 600 and 700 via the SAN 60.

In addition, the network 40 is coupled to an external network 50. Clients 800 and 900 are coupled to the network 50. Further, a management terminal 30 is coupled to the network 40.

The management server 100 is a server computer that manages the operation of the VM executing servers 200 and 300, the switches 400 and 500, and the storages 600 and 700. The management server 100 also plays a role of collecting logs from the VM executing servers 200 and 300, the switches 400 and 500, and the storages 600 and 700, and providing the collected logs to the clients 800 and 900. At this time, the management server 100 conceals specific information included in the provided logs in order to protect the specific information within the system from being leaked to the outside. The management server 100 is an example of the log management device 1 according to the first embodiment.

The VM executing servers 200 and 300 are server computers that execute virtual machines. The VM executing servers 200 and 300 each execute a hypervisor, and by a function of the hypervisor, allocate computing resources of CPUs and RAMs included in the VM executing servers 200 and 300 to the virtual machines. The respective hypervisors of the VM executing servers 200 and 300 transmit logs to the management server 100 via the network 40. The VM executing servers 200 and 300 are an example of the information processing devices 2 and 3 in the first embodiment. Each of the VM executing servers 200 and 300 may be referred to as a physical machine.

The switches 400 and 500 are relay devices that relay communication between the network 40 and the VM executing servers 200 and 300. The switches 400 and 500 transmit information such as the state of hardware included therein (a processor, a RAM, and a communication port or the like), logs, and the like to the management server 100 via the network 40.

The storages 600 and 700 are external storages that store business data processed by the virtual machines on the VM executing servers 200 and 300. The storages 600 and 700 transmit information such as the state of hardware included therein (a processor and a storage device such as a RAM and an HDD, a solid state drive (SSD), or the like), logs, and the like to the management server 100 via the network 40.

The clients 800 and 900 are client computers that access the VM executing servers 200 and 300 via the networks 40 and 50, and use the virtual machines. The client 800 is used by a user 71. The client 900 is used by a user 72. The users 71 and 72 belong to different tenants.

The management terminal 30 is a client computer used by an administrator 81 of the system.

Figure 3:
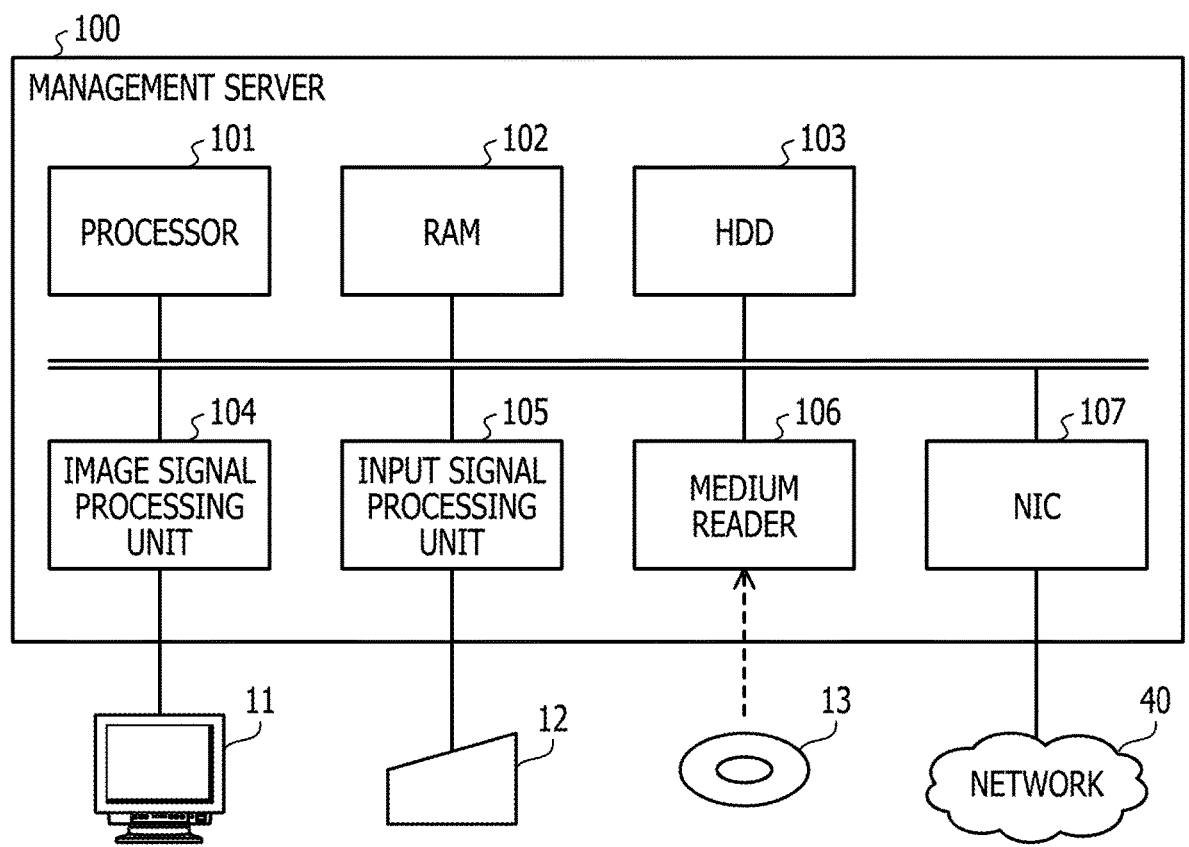
FIG. 3 is a diagram illustrating an example of hardware of a management server.

FIG. 3 is a diagram illustrating an example of hardware of a management server. The management server 100 includes a processor 101, a RAM 102, an HDD 103, an image signal processing unit 104, an input signal processing unit 105, a medium reader 106, and a network interface card (NIC) 107. Each piece of hardware is coupled to a bus of the management server 100. The VM executing servers 200 and 300, the clients 800 and 900, and the management terminal 30 may also be implemented by using hardware similar to that of the management server 100.

The processor 101 is hardware that controls information processing of the management server 100. The processor 101 may be a multiprocessor. The processor 101 is, for example, a CPU, a DSP, an ASIC, an FPGA, or the like. The processor 101 may be a combination of two or more elements among the CPU, the DSP, the ASIC, the FPGA, and the like.

The RAM 102 is a main storage device of the management server 100. The RAM 102 temporarily stores at least a part of an OS program and an application program executed by the processor 101. In addition, the RAM 102 stores various kinds of data used for processing by the processor 101.

The HDD 103 is an auxiliary storage device of the management server 100. The HDD 103 magnetically writes and reads data on a built-in magnetic disk. The HDD 103 stores the OS program, the application program, and various kinds of data. The management server 100 may have another kind of auxiliary storage device such as a flash memory, an SSD, or the like, and may have a plurality of auxiliary storage devices.

The image signal processing unit 104 outputs an image to a display 11 coupled to the management server 100 according to an instruction from the processor 101. Usable as the display 11 are a cathode ray tube (CRT) display, a liquid crystal display, and the like.

The input signal processing unit 105 obtains an input signal from an input device 12 coupled to the management server 100, and outputs the input signal to the processor 101. Usable as the input device 12 are a pointing device such as a mouse, a touch panel, or the like, a keyboard, and the like.

The medium reader 106 is a device that reads a program and data recorded on a recording medium 13. Usable as the recording medium 13 are a magnetic disk such as a flexible disk (FD), an HDD, or the like, an optical disk such as a compact disc (CD), a digital versatile disc (DVD), or the like, and a magneto-optical disk (MO). Also usable as the recording medium 13 is a nonvolatile semiconductor memory such as a flash memory card or the like. The medium reader 106 stores the program and the data read from the recording medium 13 in the RAM 102 or on the HDD 103 according to an instruction from the processor 101, for example.

The NIC 107 communicates with another device via the network 40. The NIC 107 may be a wire communication interface, or may be a wireless communication interface.

Figure 4:
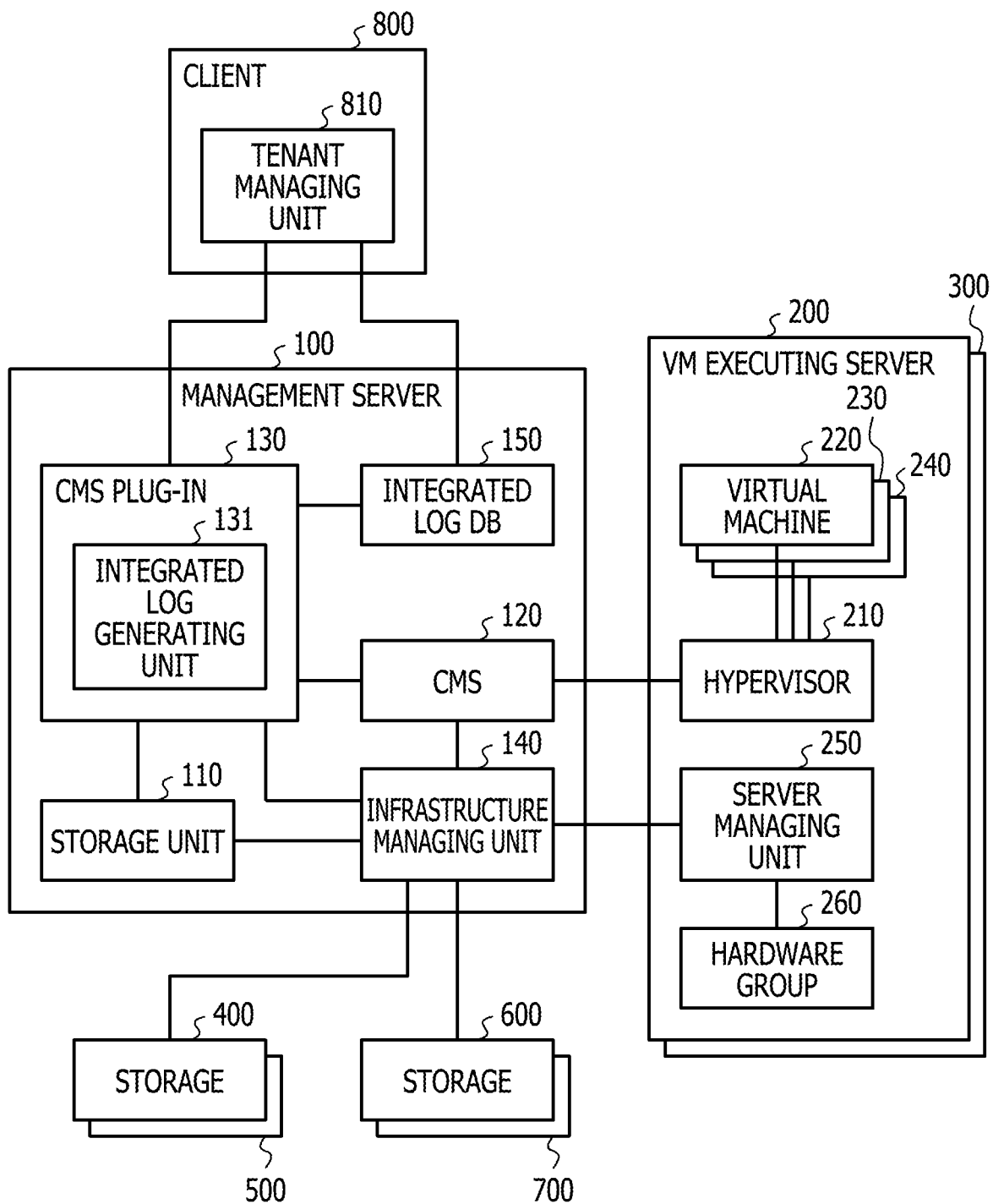
FIG. 4 is a diagram illustrating an example of functions of a management server.

FIG. 4 is a diagram illustrating an example of functions of a management server. The management server 100 includes a storage unit 110, a cloud management system (CMS) 120, a CMS plug-in 130, an infrastructure managing unit 140, and an integrated log DB 150.

The storage unit 110 and the integrated log DB 150 are implemented by using storage areas of the RAM 102 and the HDD 103. The CMS 120, the CMS plug-in 130, and the infrastructure managing unit 140 are implemented by the processor 101. For example, the processor 101 exerts functions of the CMS 120, the CMS plug-in 130, and the infrastructure managing unit 140 by executing a given program stored in the RAM 102. Alternatively, the CMS 120, the CMS plug-in 130, and the infrastructure managing unit 140 may be implemented by hard wired logic such as an FPGA, an ASIC, or the like. In addition, a DB management system (DBMS) of the integrated log DB 150 is also similarly implemented by the processor 101. Processing regarding the integrated log DB 150 may be considered to be performed by the DBMS of the integrated log DB 150.

The storage unit 110 stores information related to the addresses (for example, the IP addresses) of components (which may be alternatively referred to as nodes) whose logs are to be obtained and information related to the node identifiers corresponding to the addresses. The components whose logs are to be obtained include hypervisors. In addition, the components whose logs are to be obtained include hardware of the VM executing servers 200 and 300, the switches 400 and 500, and the storages 600 and 700 or the like.

In the following, the node identifiers will be referred to as node IDs. The node IDs are the identification information of the components, and are information retained by the respective components in advance. The node IDs may be information given to the respective components in advance for system management by the administrator 81 of the system.

The CMS 120 is software that performs integrated management of the respective hypervisors and virtual machines of the VM executing servers 200 and 300. The CMS 120 obtains the node IDs of the hypervisors from the VM executing servers 200 and 300, and provides the node IDs to the infrastructure managing unit 140.

Here, for example, the VM executing server 200 executes a hypervisor 210. The hypervisor 210 operates virtual machines 220, 230, and 240 using computing resources such as a CPU, a RAM, and the like of the VM executing server 200. The CMS 120 obtains the node ID of the hypervisor 210 from the VM executing server 200.

The CMS plug-in 130 is a plug-in of the CMS 120. In response to a request from a tenant managing unit 810 included in the client 800, the CMS plug-in 130 processes the logs of respective components in cooperation with the infrastructure managing unit 140. Here, the tenant managing unit 810 is client software for presenting logs of virtual machines, hypervisors related to the virtual machines, and hardware or the like to an administrator on the tenant side. The CMS plug-in 130 includes an integrated log generating unit 131.

The integrated log generating unit 131 collects logs of respective components (hypervisors and hardware) from the infrastructure managing unit 140, and generates an integrated log based on the collected logs. The integrated log generating unit 131 may collect the log regarding the hypervisor 210 from the hypervisor 210. The integrated log is a log in which the logs of the respective components are converted into a file in a single format. The format of the integrated log is extensible markup language (XML), for example. The integrated log generating unit 131 stores the generated integrated log in the integrated log DB 150.

The infrastructure managing unit 140 collects the node IDs corresponding to the IP addresses of the respective components of the system based on the IP addresses, and stores the node IDs in the storage unit 110. For example, the infrastructure managing unit 140 collects the node IDs of the respective hypervisors on the VM executing servers 200 and 300 via the CMS 130. In addition, the infrastructure managing unit 140 collects the node IDs of the hardware included in the VM executing servers 200 and 300 from the VM executing servers 200 and 300. Further, the infrastructure managing unit 140 collects node IDs also from the switches 400 and 500 and the storages 600 and 700, respectively. The infrastructure managing unit 140 provides the collected node IDs to the CMS plug-in 130.

In addition, the infrastructure managing unit 140 collects logs from the VM executing servers 200 and 300, the switches 400 and 500, and the storages 600 and 700, and provides the logs to the CMS plug-in 130. The logs are provided from the infrastructure managing unit 140 to the CMS plug-in 130 in a JavaScript object notation (JSON) format by a RESTful application programming interface (API), for example (Javascript is a registered trademark).

For example, the infrastructure managing unit 140 collects logs of the hardware of the VM executing servers 200 and 300 by using a management function referred to as an integrated remote management controller (iRMC) possessed by each of the VM executing servers 200 and 300. Here, the VM executing server 200 includes a server managing unit 250 that provides the function of the iRMC. The server managing unit 250 obtains a log of a hardware group 260 (a processor, a RAM, an HDD, and a NIC or the like) of the VM executing server 200. The infrastructure managing unit 140 collects the log of the hardware group 260 from the server managing unit 250.

In addition, for example, the infrastructure managing unit 140 collects logs of the hardware of the switches 400 and 500 and the storages 600 and 700 using a management interface referred to as an intelligent platform management interface (IPMI) possessed by each of the switches 400 and 500 and the storages 600 and 700.

The integrated log DB 150 stores the integrated log generated by the CMS plug-in 130. As described earlier, the integrated log is obtained by converting the logs of the respective components into a single format (for example, XML). In the integrated log, specific information is masked by other information. Here, the specific information to be masked is information related to an IP address and an account, for example. The integrated log DB 150 provides the integrated log to the tenant managing unit 810 in response to a reference request for the integrated log from the tenant managing unit 810.

Figure 5:
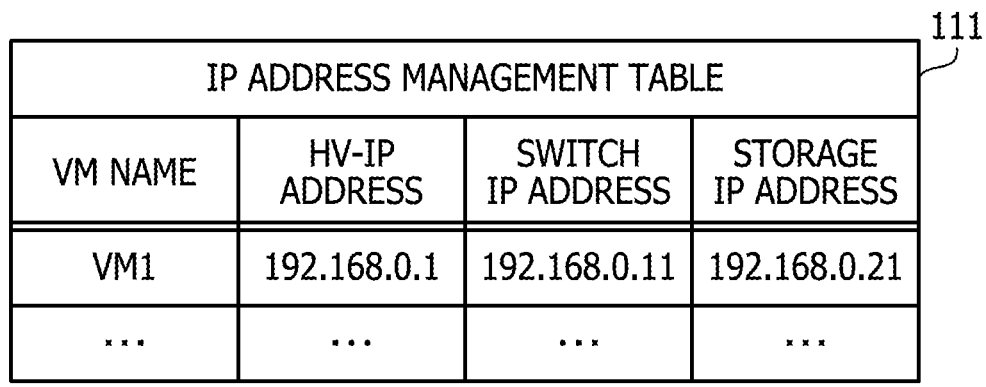
FIG. 5 is a diagram illustrating an example of an internet protocol (IP) address management table.

FIG. 5 is a diagram illustrating an example of an IP address management table. The IP address management table 111 is stored in the storage unit 110 in advance. The IP address management table 111 includes items of a VM name, an HV-IP address, a switch IP address, and a storage IP address.

The name (VM name) of a virtual machine is registered as the item of the VM name. The IP address of a hypervisor operating the virtual machine is registered as the item of the HV-IP address. The IP address of a switch to which a VM executing server executing the hypervisor is coupled is registered as the item of the switch IP address. The IP address of a storage accessed from the VM executing server is registered as the item of the storage IP address.

As an example, the IP address management table 111 has a record registered therein in which the VM name is "VM1," the HV-IP address is "192.168.0.1," the switch IP address is "192.168.0.11," and the storage IP address is "192.168.0.21." Here, the IP address "192.168.0.1" is the IP address of the hypervisor 210. This record indicates that the IP address of the hypervisor 210 operating the virtual machine having the VM name "VM1" is "192.168.0.1." In addition, the record indicates that the IP address of the switch 400 to which the VM executing server 200 executing the hypervisor 210 is coupled is "192.168.0.11." Further, the record indicates that the IP address of the storage 600 accessed from the VM executing server 200 is "192.168.0.21."

Also for other virtual machines, sets of a VM name, an HV-IP address, a switch IP address, and a storage IP address are registered in the IP address management table 111.

Figure 6:
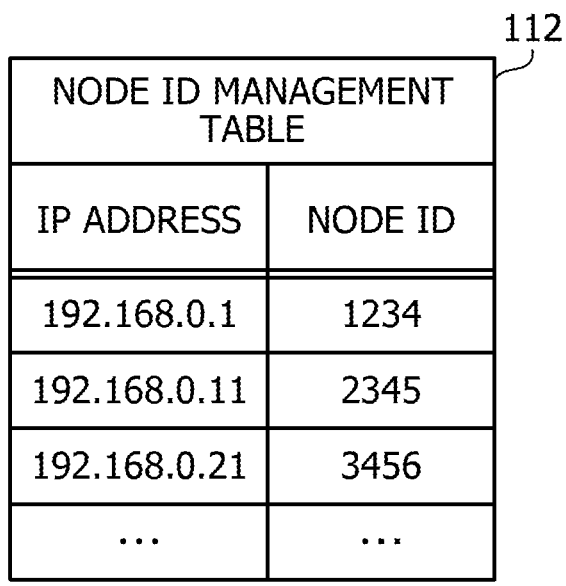
FIG. 6 is a diagram illustrating an example of a node identification (ID) management table.

FIG. 6 is a diagram illustrating an example of a node ID management table. The node ID management table 112 is generated by the infrastructure managing unit 140, and stored in the storage unit 110. The node ID management table 112 includes items of an IP address and a node ID.

The IP address of a component is registered as the item of the IP address. The node ID of the component is registered as the item of the node ID.

For example, the node ID management table 112 has a record registered therein in which the IP address is "192.168.0.1" and the node ID is "1234." This record indicates that the node ID of the component (hypervisor 210) having the IP address "192.168.0.1" is "1234."

Also for other IP addresses, sets of an IP address and a node ID are registered in the node ID management table 112.

FIG. 7 is a diagram illustrating an example of an integrated log management table. The integrated log management table 151 is generated by the integrated log generating unit 131, and stored in the integrated log DB 150. The integrated log management table 151 includes items of a VM name, a node ID, a date and time, an HV status, an HV log, an HW status, and an HW log.

The name of a virtual machine is registered as the item of the VM name. A node ID is registered as the item of the node ID. A date and time of obtainment of an integrated log is registered as the item of the date and time. The state (status) of a hypervisor is registered as the item of the HV status. A log file indicating the log of the hypervisor is registered as the item of the HV log. The state (status) of hardware related to the corresponding virtual machine is registered as the item of the HW status. A log file representing the log of the hardware is registered as the item of the HW log.

Here, statuses registered as the items of the HV status and the HW status may be, for example, "warning" (warning), "error" (error), "normal" (normal), "critical" (error more serious than "error"), "emergency" (error more serious than "critical"), and the like. As for the items of the HW status and the HW log, in a case where there are a plurality of pieces of related hardware, the items of the HW status and the HW log may be provided for each piece of hardware (for each VM executing server, each switch, and each storage, for example). Here, XML is used as the data format of the log file of the HV log and the log file of the HW log.

For example, the integrated log management table 151 has a record registered therein in which the VM name is "VM1," the node ID is "1234," the date and time is "2017/09/15 10:00:00," the HV status is "warning," the HV log is "AA1.xml," the HW status is "error," and the HW log is "AA2.xml."

This record indicates that the node ID of the hypervisor related to the virtual machine having the VM name "VM1" is "1234," and that a date and time of obtainment of the integrated log indicated by the record is 10:00:00 on Sep. 15, 2017. In addition, the record indicates that the state of the hypervisor operating the virtual machine is "warning," and that the file name of a log file regarding the hypervisor is "AA1.xml." Further, the record indicates that the state of hardware related to the virtual machine is "error," and that the file name of a log file regarding the hardware is "AA2.xml."

Also for other virtual machines, sets of a VM name, a node ID, a date and time, an HV status, an HV log, an HW status, and an HW log are registered in the integrated log management table 151.

Figure 8:
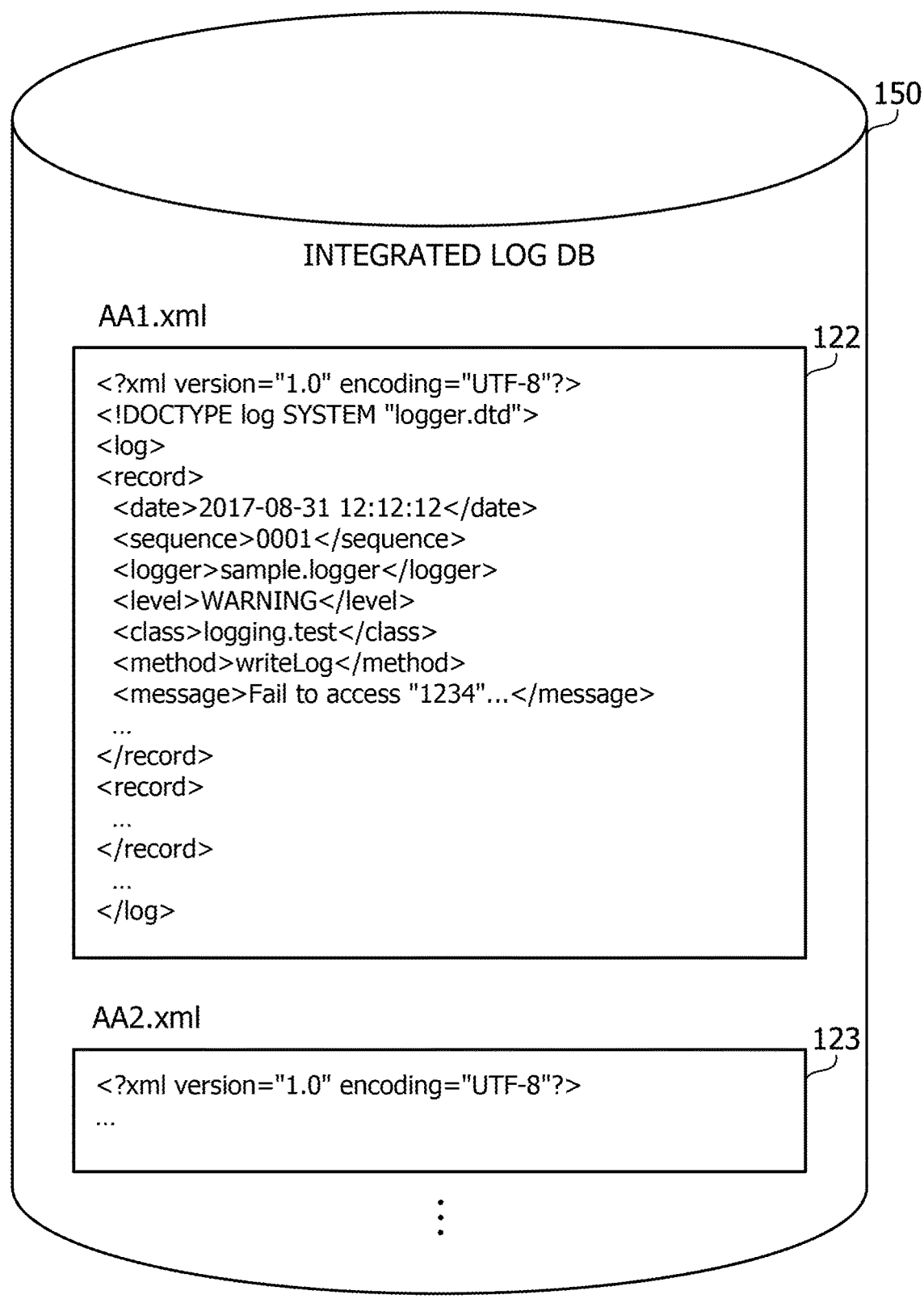
FIG. 8 is a diagram illustrating an example of log files.

FIG. 8 is a diagram illustrating an example of log files. Log files 122 and 123 are generated by the integrated log generating unit 131, and stored in the integrated log DB 150. The file name of the log file 122 is "AA1.xml." The file name of the log file 123 is "AA2.xml." For example, the log file 122 is a log of the hypervisor 210. The log file 123 is a log of hardware (the VM executing server 200, the switch 400, or the storage 600).

For example, the log file 122 describes the log regarding the hypervisor 210 in the XML format. In the log file 122, for example, information related to an IP address and an account is replaced with the node ID of the hypervisor 210. In the example of the log file 122, the part of "1234" in "message" tags indicating a message of the log is a part replaced with the node ID.

As with the log file 122, the log file 123 describes the log regarding the hardware in the XML format. Also in the log file 123, information related to an IP address and an account is replaced with the node ID of the hardware.

Log files associated with other virtual machines are also similarly registered in the integrated log DB 150.

Figure 9:
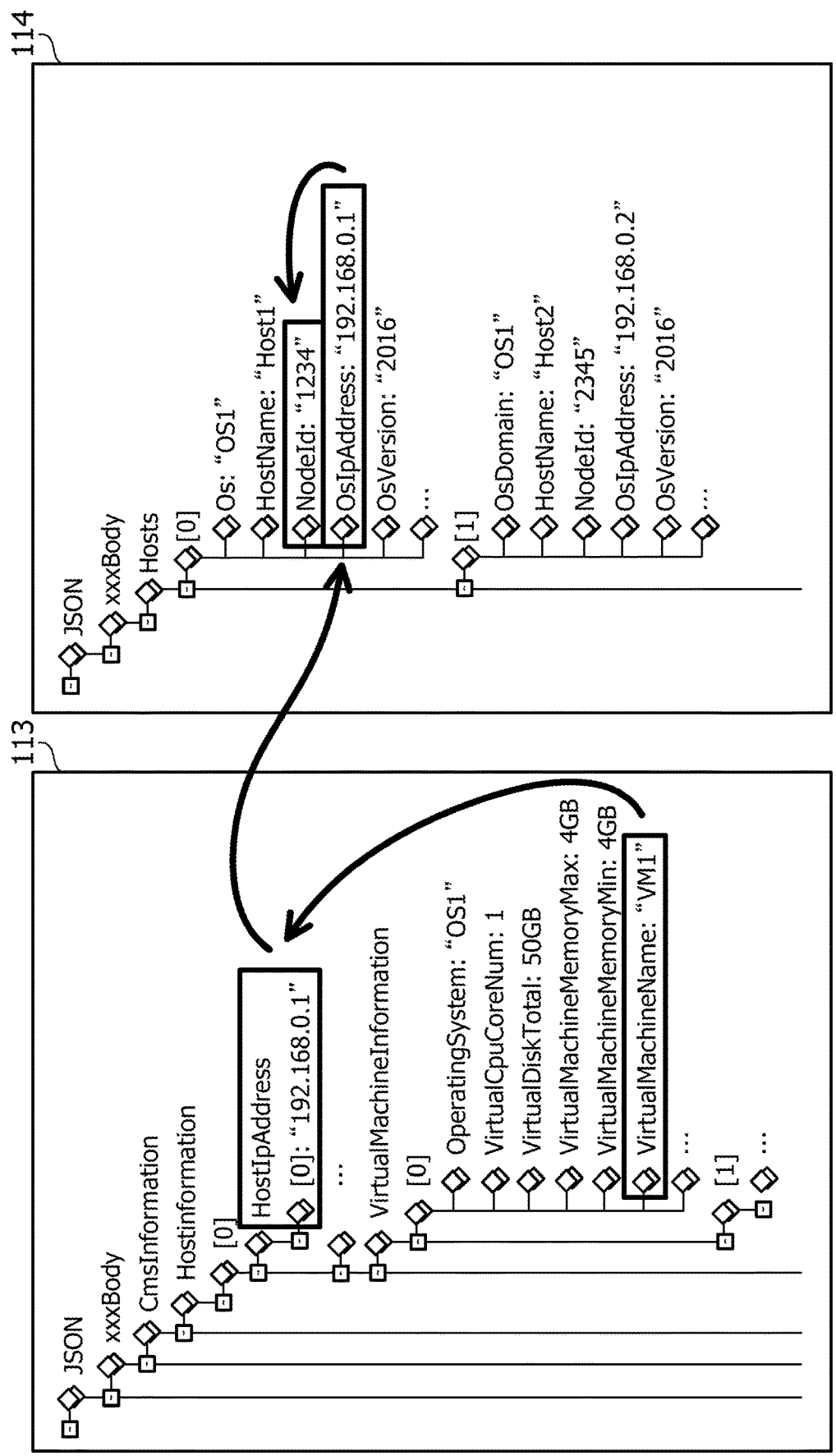
FIG. 9 is a diagram illustrating an example of identifying a node ID.

FIG. 9 is a diagram illustrating an example of identifying a node ID. The infrastructure managing unit 140 identifies a node ID based on host configuration information 113 and OS configuration information 114 obtained from the CMS 120. The host configuration information 113 is information indicating correspondence relation between a VM executing server and a virtual machine. The OS configuration information 114 is information related to the OS of each VM executing server (OS providing functions of a hypervisor).

For example, first, the infrastructure managing unit 140 obtains a virtual machine name specified by the tenant managing unit 810 via the CMS 120. Suppose as an example that the virtual machine name "VM1" is specified. In this case, the infrastructure managing unit 140 searches for the virtual machine name "VM1" in the host configuration information 113, and obtains the IP address (represented by "HostIpAddress") of a hypervisor in the VM executing server including the "VM1." In the example of the host configuration information 113, the "HostIpAddress" is "192.168.0.1." Then, the infrastructure managing unit 140 searches the OS configuration information 114 with the obtained IP address as a key, and obtains the node ID corresponding to the corresponding OS. In the example of the OS configuration information 114, the node ID ("NodeId") corresponding to the OS for which "OsIpAddress: '192.168.0.1'" is set is "1234." Because the hypervisor is a function provided by the OS, the node ID may be said to be the node ID of the hypervisor. The infrastructure managing unit 140 may thus obtain the node ID "1234" of the hypervisor 210 for the specified virtual machine name "VM1."

Incidentally, FIG. 9 illustrates an example in which the infrastructure managing unit 140 identifies the IP address from the VM name based on the host configuration information 113. On the other hand, the infrastructure managing unit 140 may identify the IP address from the virtual machine name based on the IP address management table 111. Alternatively, the item of the VM name in the IP address management table 111 may be blank at first. In this case, the infrastructure managing unit 140 may add, to the IP address management table 111, the correspondence relation between the virtual machine name and the IP address of the hypervisor, the correspondence relation being identified based on the host configuration information 113, and use the correspondence relation for subsequent identification of the IP address.

Figure 10:
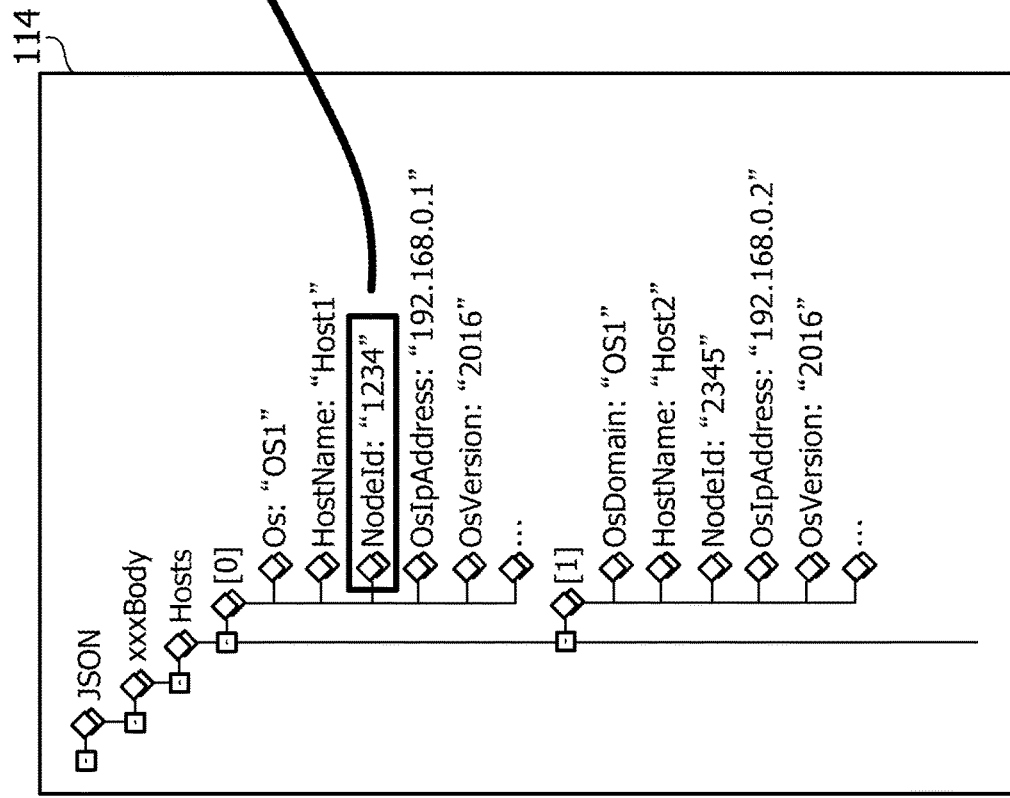
FIG. 10 is a diagram illustrating an example of obtaining information based on a node ID.

FIG. 10 is a diagram illustrating an example of obtaining information based on a node ID. The infrastructure managing unit 140 may also obtain, from the obtained node ID, a state and a log regarding hardware of the corresponding VM executing server. For example, the infrastructure managing unit 140 obtains hardware configuration information from each VM executing server. Each piece of hardware configuration information includes information related to hardware included in the VM executing server as an obtainment source. In addition, each piece of hardware configuration information includes a node ID.

The infrastructure managing unit 140 identifies hardware configuration information 115 including the node ID "1234" obtained from the OS configuration information 114 among these pieces of hardware configuration information. Then, the infrastructure managing unit 140 obtains, from the identified hardware configuration information 115, the state of hardware (hardware group 260) of the corresponding VM executing server (VM executing server 200) and a log regarding the hardware. For example, the infrastructure managing unit 140 may obtain information related to a peripheral component interconnect express (PCIe) device in the corresponding VM executing server and information related to firmware from the hardware configuration information 115.

The infrastructure managing unit 140 similarly obtains the states of hardware of the switch 400 and the storage 600 and logs regarding the hardware by identifying hardware configuration information including the node ID of the switch 400 and the node ID of the storage 600.

FIG. 11 is a diagram illustrating an example of conversion of a log file. As an example, a log file 117 is obtained by converting, into the XML format, a log in the JSON format regarding the hypervisor 210, the log being obtained from the infrastructure managing unit 140 by the integrated log generating unit 131. The log file 117 includes a description "Fail to connect '192.168.0.21'" in message tags. The part of "192.168.0.21" corresponds to an IP address description format. Therefore, the integrated log generating unit 131 replaces the part with a node ID "3456" corresponding to "192.168.0.21" based on the node ID management table 112.

In addition, for example, the log file 117 includes a description "account 'user0001' logon" in message tags. The part of "account 'user0001'" corresponds to an account description format. The part of "user0001" following "account," for example, corresponds to an account name. Therefore, the integrated log generating unit 131 replaces the part of the account name with the node ID "1234" of the hypervisor 210. The integrated log generating unit 131 thus creates the log file 122, and stores the log file 122 in the integrated log DB 150.

Incidentally, the integrated log generating unit 131 may identify the node ID corresponding to the account name by referring to the node ID management table 112 based on the IP address of the component as a source of obtainment of the corresponding log. Alternatively, correspondence information between the account name and the node ID may be stored in the storage unit 110 in advance. In this case, the integrated log generating unit 131 may perform conversion from the account name to the node ID based on the correspondence information stored in the storage unit 110.

Description will next be made of a flow of collecting a node ID and a log by the management server 100. Here, in the following description, a log regarding a hypervisor may be referred to as an HV log, and a log regarding hardware may be referred to as an HW log.

Figure 12:
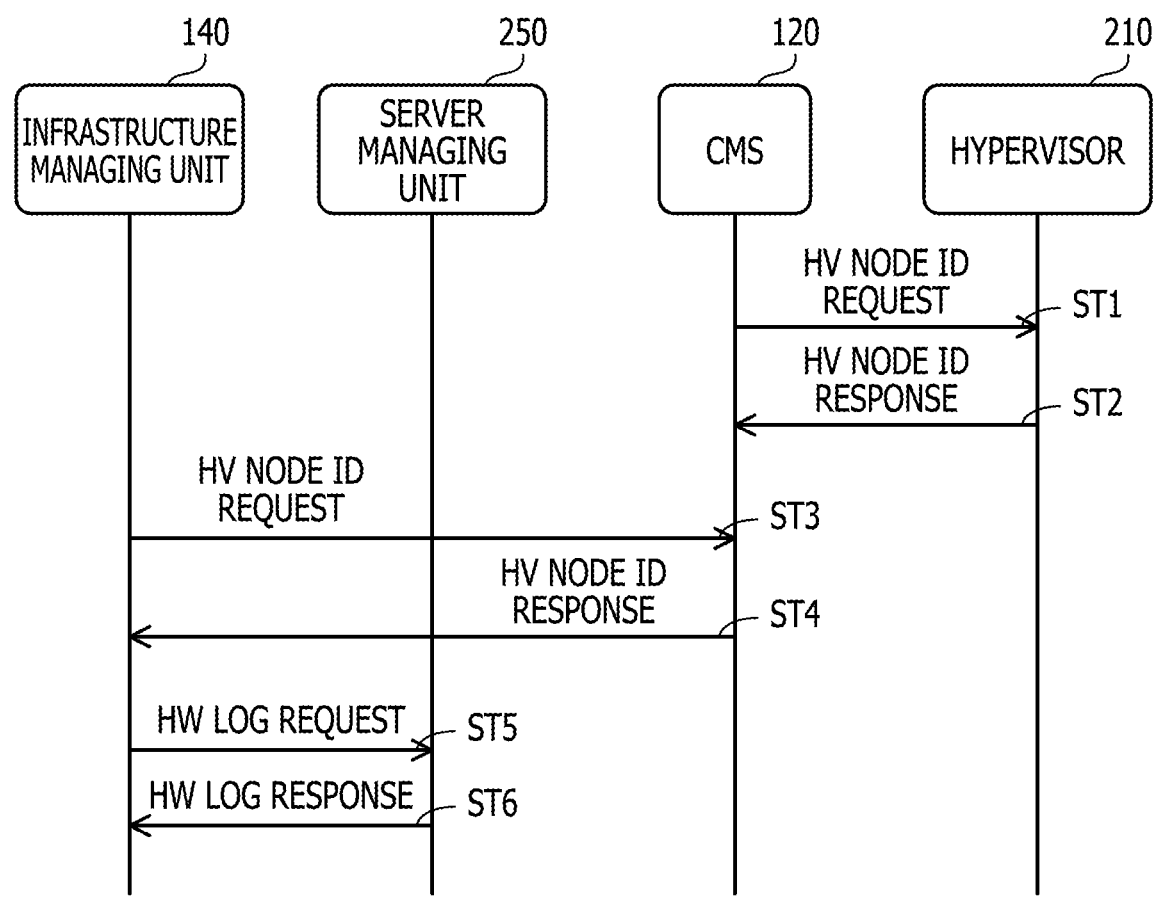
FIG. 12 is a sequence diagram illustrating an example of processing of collecting a node ID and a log.

FIG. 12 is a sequence diagram illustrating an example of processing of collecting a node ID and a log. The processing illustrated in FIG. 12 will be described in the following along step numbers.

(ST1) The CMS 120 requests a node ID from the hypervisor 210 based on the IP address management table 111.

(ST2) The hypervisor 210 returns a response of the node ID of the hypervisor 210 to the CMS 120 in response to the request for the node ID. The CMS 120 receives the response of the node ID of the hypervisor 210.

(ST3) The infrastructure managing unit 140 requests the node ID of the hypervisor 210 from the CMS 120.

(ST4) In response to the request for the node ID, the CMS 120 returns a response of the node ID of the hypervisor 210, the node ID being obtained in step ST2, to the infrastructure managing unit 140. The infrastructure managing unit 140 receives the response of the node ID of the hypervisor 210, and registers the node ID of the hypervisor 210 in the node ID management table 112 stored in the storage unit 110.

(ST5) The infrastructure managing unit 140 requests an HW log regarding the hardware group 260 from the server managing unit 250 based on the IP address management table 111.

(ST6) In response to the request for the HW log, the server managing unit 250 returns a response of the HW log regarding the hardware group 260 and the status of the hardware group 260 to the infrastructure managing unit 140. The infrastructure managing unit 140 receives the HW log and the status regarding the hardware group 260, and stores the HW log and the status regarding the hardware group 260 in the storage unit 110. The HW log obtained by the infrastructure managing unit 140 includes the host configuration information 113, the OS configuration information 114, and the hardware configuration information 115 described above.

Here, the infrastructure managing unit 140 collects node IDs and HW logs also from other hardware such as the switches 400 and 500 and the storages 600 and 700 or the like. For example, the infrastructure managing unit 140 obtains the HW log and status of each piece of hardware based on the IP address management table 111, and stores the obtained HW log and the obtained status in the storage unit 110 in association with the IP address of the corresponding hardware.

Incidentally, the infrastructure managing unit 140 collects node IDs from the switches 400 and 500 and the storages 600 and 700 without the intervention of the CMS 120 (directly collects the node IDs via the IPMIs). The infrastructure managing unit 140 obtains the node ID of each piece of hardware based on the IP address management table 111, and registers correspondence relation between the IP address and the node ID in the node ID management table 112.

In addition, the collection of the node IDs and the HW logs by the infrastructure managing unit 140 is performed in such a manner as to be asynchronous to log provision processing to be illustrated in the following. For example, the infrastructure managing unit 140 may perform the collection of the node IDs in given timing immediately after a start of the management server 100 or the like. For example, the infrastructure managing unit 140 may perform the collection of the HW logs as needed (in a given cycle, for example).

Description will next be made of a flow of log provision processing by the management server 100. The management server 100 performs the processing of providing a log to a user in cooperation with the client 800.

Figure 13:
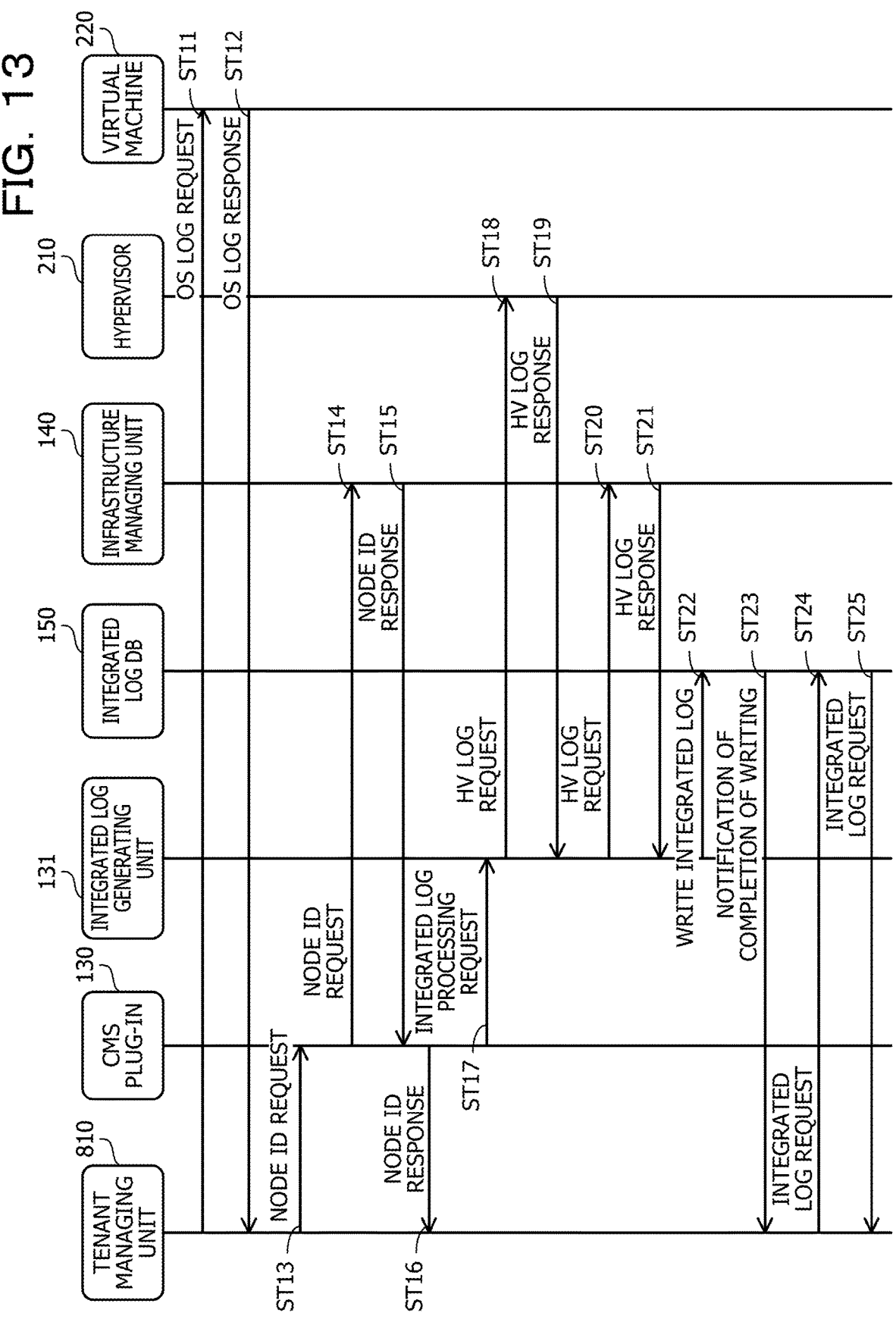
FIG. 13 is a sequence diagram illustrating an example of log provision processing.

FIG. 13 is a sequence diagram illustrating an example of log provision processing. The processing illustrated in FIG. 13 will be described in the following along step numbers.

(ST11) The tenant managing unit 810 requests an OS log of the virtual machine 220 selected by the user 71 from the virtual machine 220. For example, when a fault occurs in the virtual machine 220, the user 71 may select the virtual machine name of the virtual machine 220 from a virtual machine name selecting screen provided by the tenant managing unit 810. The tenant managing unit 810 transmits a request for the OS log including the thus selected virtual machine name to the virtual machine 220.

(ST12) In response to the request for the OS log, the virtual machine 220 returns a response of the OS log to the tenant managing unit 810. The tenant managing unit 810 displays the OS log of the virtual machine 220 on a display of the client 800.

(ST13) The tenant managing unit 810 requests, from the CMS plug-in 130, the node ID of the hypervisor 210 operating the virtual machine 220 and the node ID of the hardware related to the hypervisor 210. The request for the node IDs includes the virtual machine name of the virtual machine 220 selected by the user.

(ST14) The CMS plug-in 130 requests the node IDs of the hypervisor 210 and the hardware from the infrastructure managing unit 140. The request for the node IDs also includes the virtual machine name of the virtual machine 220 selected by the user.

(ST15) The infrastructure managing unit 140 identifies the IP address corresponding to the virtual machine name included in the request for the node IDs based on the host configuration information 113. Then, the infrastructure managing unit 140 identifies the node ID corresponding to the identified IP address based on the OS configuration information 114. The infrastructure managing unit 140 registers correspondence relation between the identified IP address and the identified node ID in the node ID management table 112. In addition, the infrastructure managing unit 140 identifies the node ID of the hardware related to the identified IP address based on the IP address management table 111 and the node ID management table 112. Then, the infrastructure managing unit 140 returns a response of the identified node ID of the hypervisor 210, the identified IP address of the hypervisor 210, and the identified node ID of the hardware to the CMS plug-in 130.

(ST16) The CMS plug-in 130 returns a response of the obtained node ID of the hypervisor 210 and the obtained node ID of the hardware to the tenant managing unit 810. The tenant managing unit 810 obtains each of the node IDs.

(ST17) The CMS plug-in 130 requests the integrated log generating unit 131 to perform processing of generating an integrated log related to the hypervisor 210. The request includes the node ID of the hypervisor 210 and the virtual machine name selected by the user.

(ST18) In response to the integrated log processing request, the integrated log generating unit 131 requests an HV log from the hypervisor 210. For example, the integrated log generating unit 131 identifies the IP address of the hypervisor 210 corresponding to the specified node ID based on the node ID management table 112, and grasps an HV log request destination based on the identified IP address.

(ST19) In response to the request, the hypervisor 210 returns a response of the HV log regarding the hypervisor 210 and the status of the hypervisor 210 to the integrated log generating unit 131. For example, the HV log regarding the hypervisor 210 is provided from the hypervisor 210 to the integrated log generating unit 131 in a given format such as comma-separated values (CSV) or the like.

(ST20) The integrated log generating unit 131 identifies the IP address of the hardware related to the hypervisor 210 based on the IP address management table 111. The integrated log generating unit 131 requests an HW log regarding the hardware corresponding to the identified IP address from the infrastructure managing unit 140.

(ST21) In response to the request for the HW log, the infrastructure managing unit 140 returns a response of the HW log of the hardware corresponding to the IP address and the status of the hardware to the integrated log generating unit 131. The HW log is provided from the infrastructure managing unit 140 to the integrated log generating unit 131 in the JSON format.

(ST22) The integrated log generating unit 131 generates a log file in which the HV log regarding the hypervisor 210, the HV log being obtained in step ST19, and the HW log regarding the hardware, the HW log being obtained in step ST21, are converted into the XML format. Then, the integrated log generating unit 131 replaces descriptions of the IP addresses included in the log file after the conversion with the node IDs corresponding to the IP addresses based on the node ID management table 112. In addition, the integrated log generating unit 131 replaces descriptions of the account names included in the log file with the node IDs of the components corresponding to the log file.

The integrated log generating unit 131 registers, in the integrated log DB 150, the log file after the replacement with the node IDs (respective log files regarding the hypervisor 210 and the hardware) and the statuses of the hypervisor 210 and the hardware. For example, the integrated log generating unit 131 generates a record in which the log file and the statuses are associated with the VM name selected by the user, the node ID of the hypervisor 210, and a present date and time, and inserts the record into the integrated log DB 150. This completes the writing of the integrated log of the hypervisor 210 and the hardware related to the virtual machine 220.

(ST23) The integrated log DB 150 (DBMS) notifies the completion of the writing of the integrated log to the tenant managing unit 810.

(ST24) The tenant managing unit 810 specifies the node ID of the hypervisor 210, the node ID being obtained in step ST16, and requests the integrated log DB 150 to read the integrated log.

(ST25) The integrated log DB 150 searches the integrated log management table 151 using, as a key, the node ID specified in the request to read the integrated log. The integrated log DB 150 obtains, by the search, the status of the hypervisor 210 corresponding to the specified node ID, the log file of the hypervisor 210, the status of the hardware, and the log file of the hardware. The integrated log DB 150 returns a response of the obtained statuses and the obtained log files to the tenant managing unit 810. The tenant managing unit 810 displays the status and the log file of the hypervisor 210 and the status and the log file of the hardware on the display of the client 800. In the log displayed by the client 800, the IP addresses and the account names are masked by the node IDs.

Incidentally, in step ST24, the tenant managing unit 810 may also search the integrated log DB 150 by the node ID of the hardware related to the hypervisor 210. In that case, the tenant managing unit 810 may retrieve, by full-text retrieval, a log message including the node ID of the hardware from log files registered as the items of HW logs in the integrated log management table 151, and display the log message on the display.

Thus, when the identification information (virtual machine name) of the virtual machine is specified by the client 800, the management server 100 transmits the node IDs of the hypervisor and the hardware related to the virtual machine to the client 800. The management server 100 transmits a notification of completion of storage of the integrated log into the integrated log DB 150 after the transmission of the node IDs to the client 800. When the management server 100 receives a corresponding node ID from the client 800 in response to the notification, the management server 100 outputs (transmits) the integrated log corresponding to the node ID to the client 800. The management server 100 may thereby provide the integrated log corresponding to the node ID only to the client 800 to which the node ID is already notified. Thus limiting the range of provision of the integrated log regarding the corresponding node ID may protect the contents of the integrated log from being provided to extra users.

A procedure of each part in the above-described sequence will next be described in detail. A processing procedure of the client 800 will first be described.

Figure 14:
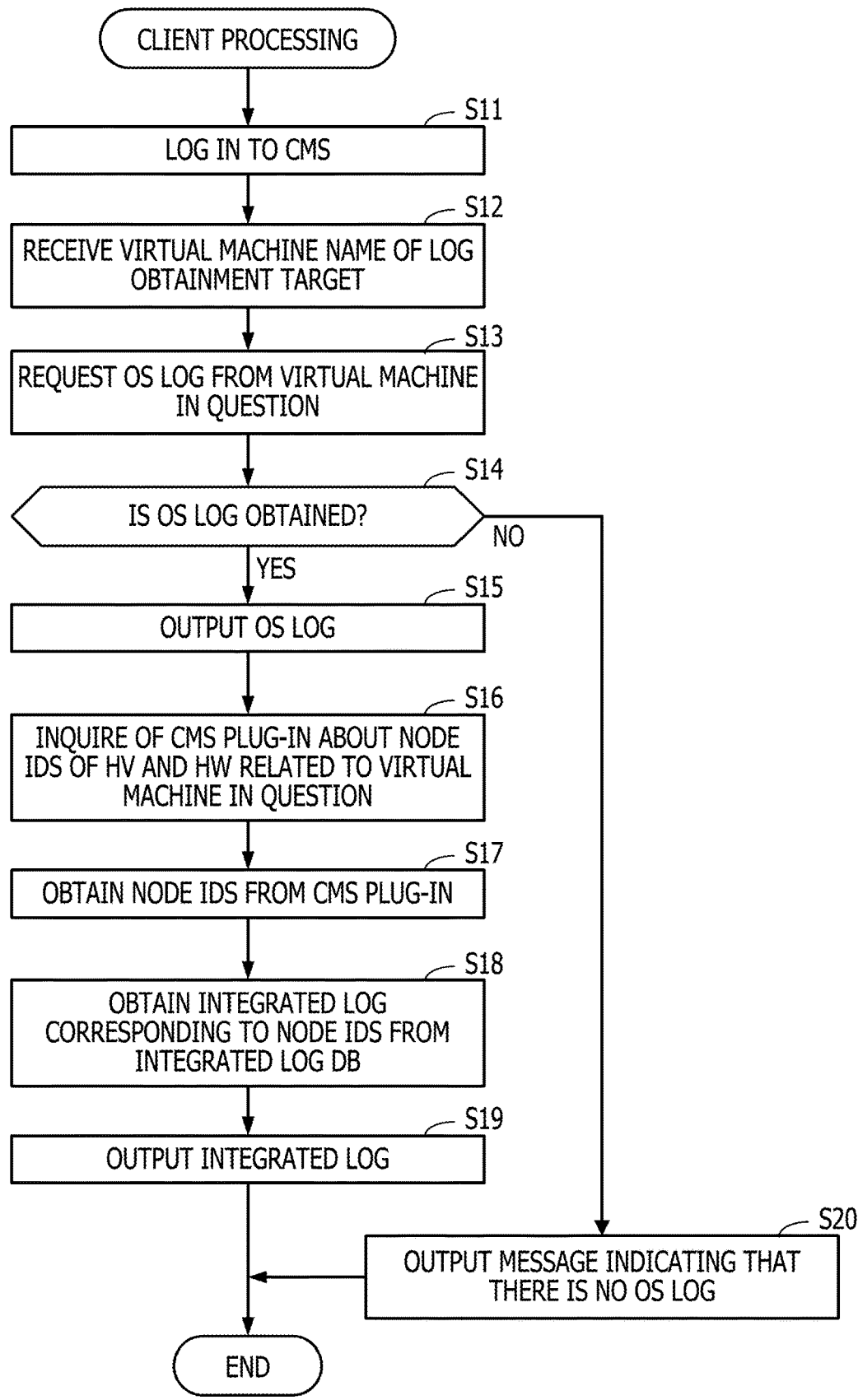
FIG. 14 is a flowchart illustrating an example of client processing.

FIG. 14 is a flowchart illustrating an example of client processing. The processing illustrated in FIG. 14 will be described in the following along step numbers.

(S11) The tenant managing unit 810 receives the user ID and password of the user 71, and logs in to the CMS 120 via the CMS plug-in 130.

(S12) The tenant managing unit 810 receives the virtual machine name of a log obtainment target (for example, the virtual machine name of a virtual machine in which a problem has occurred in operation thereof), the virtual machine name being input by the user 71. For example, the tenant managing unit 810 receives the virtual machine name of the virtual machine 220.

(S13) The tenant managing unit 810 requests an OS log from the virtual machine 220.

(S14) The tenant managing unit 810 determines whether or not the OS log may be obtained from the virtual machine 220. When the OS log may be obtained, the tenant managing unit 810 advances the processing to step S15. When it is difficult to obtain the OS log, the tenant managing unit 810 advances the processing to step S20.

(S15) The tenant managing unit 810 displays the OS log of the virtual machine 220 on the display of the client 800.

(S16) The tenant managing unit 810 inquires of the CMS plug-in 130 about the node IDs of the hypervisor 210 and hardware related to the virtual machine in question (virtual machine 220).

(S17) The tenant managing unit 810 obtains the node ID of the hypervisor 210 and the node ID of the hardware related to the hypervisor 210 from the CMS plug-in 130.

(S18) The tenant managing unit 810 obtains an integrated log corresponding to the node IDs obtained in step S17 from the integrated log DB 150. As described earlier, the tenant managing unit 810 may use the node ID of the hypervisor 210 as a search key in the integrated log DB 150, or may use the node ID of the hardware related to the hypervisor 210 as a search key in the integrated log DB 150.

(S19) The tenant managing unit 810 outputs the obtained integrated log. For example, the tenant managing unit 810 makes the display of the client 800 display the integrated log. The tenant managing unit 810 then ends the processing.

(S20) The tenant managing unit 810 outputs a message indicating that there is no OS log. For example, the tenant managing unit 810 makes the display of the client 800 display a message to the effect that there is no corresponding OS log. The tenant managing unit 810 may display a message to the effect that the virtual machine 220 is down. The tenant managing unit 810 then ends the processing.

A processing procedure of the CMS plug-in 130 will next be described.

Figure 15:
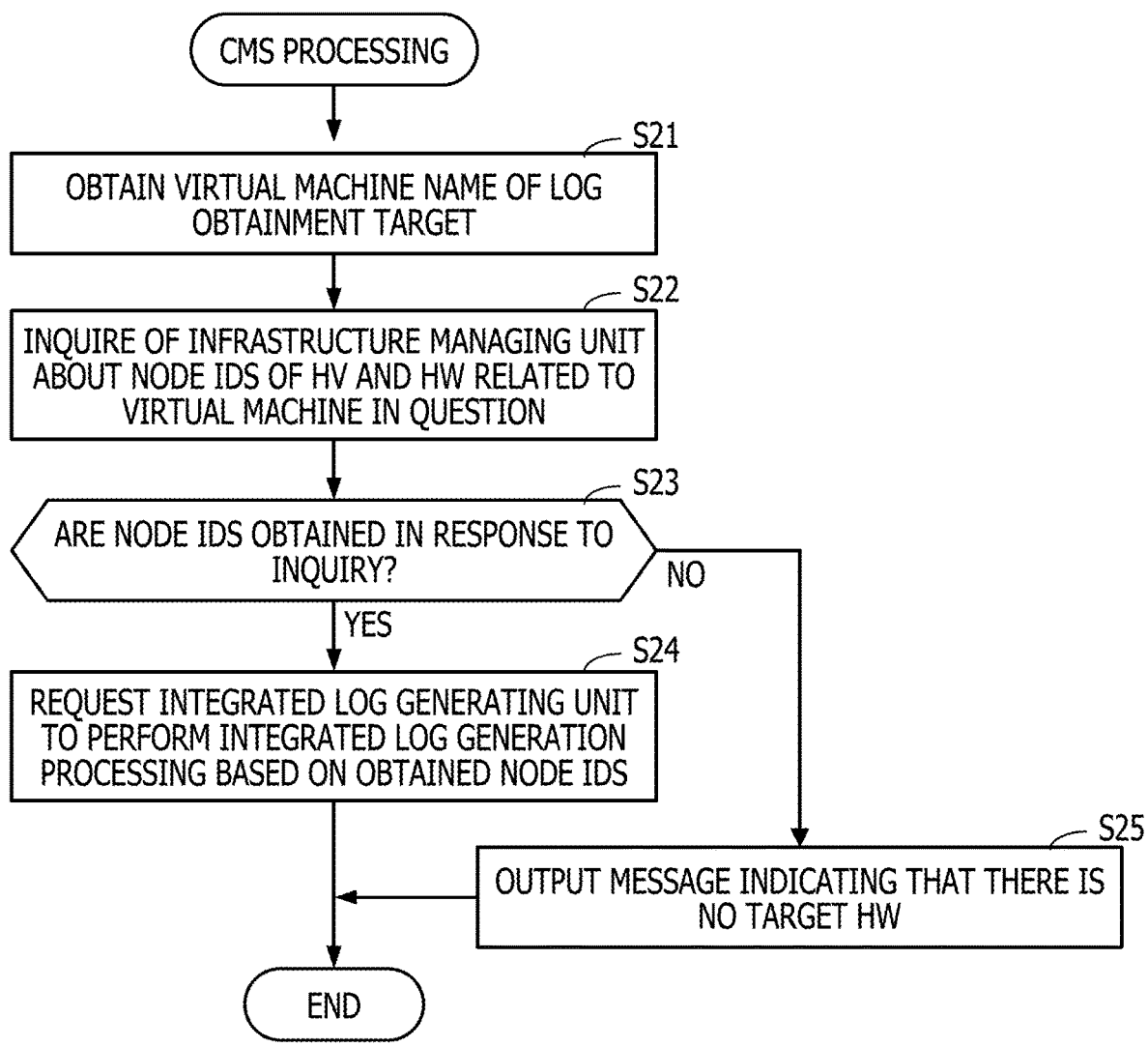
FIG. 15 is a flowchart illustrating an example of cloud management system (CMS) processing.

FIG. 15 is a flowchart illustrating an example of CMS processing. The processing illustrated in FIG. 15 will be described in the following along step numbers.

(S21) The CMS plug-in 130 obtains the virtual machine name of the log obtainment target from the tenant managing unit 810.

(S22) The CMS plug-in 130 inquires of the infrastructure managing unit 140 about the node IDs of the hypervisor and hardware related to the virtual machine in question (virtual machine 220).

(S23) The CMS plug-in 130 determines whether or not the node IDs may be obtained in response to the inquiry. When the node IDs may be obtained, the CMS plug-in 130 advances the processing to step S24. When it is difficult to obtain the node IDs, the CMS plug-in 130 advances the processing to step S25.

(S24) The CMS plug-in 130 requests the integrated log generating unit 131 to perform integrated log generation processing based on the obtained node IDs. In addition, the CMS plug-in 130 notifies the tenant managing unit 810 of the obtained node ID of the hypervisor 210 and the obtained node ID of the hardware. The CMS plug-in 130 then ends the processing.

(S25) The CMS plug-in 130 outputs a message indicating that there is no log obtainment target hardware. For example, the CMS plug-in 130 notifies the message to the tenant managing unit 810, and makes the display of the client 800 display the contents of the message. The CMS plug-in 130 then ends the processing.

A processing procedure of the integrated log generating unit 131 will next be described.

Figure 16:
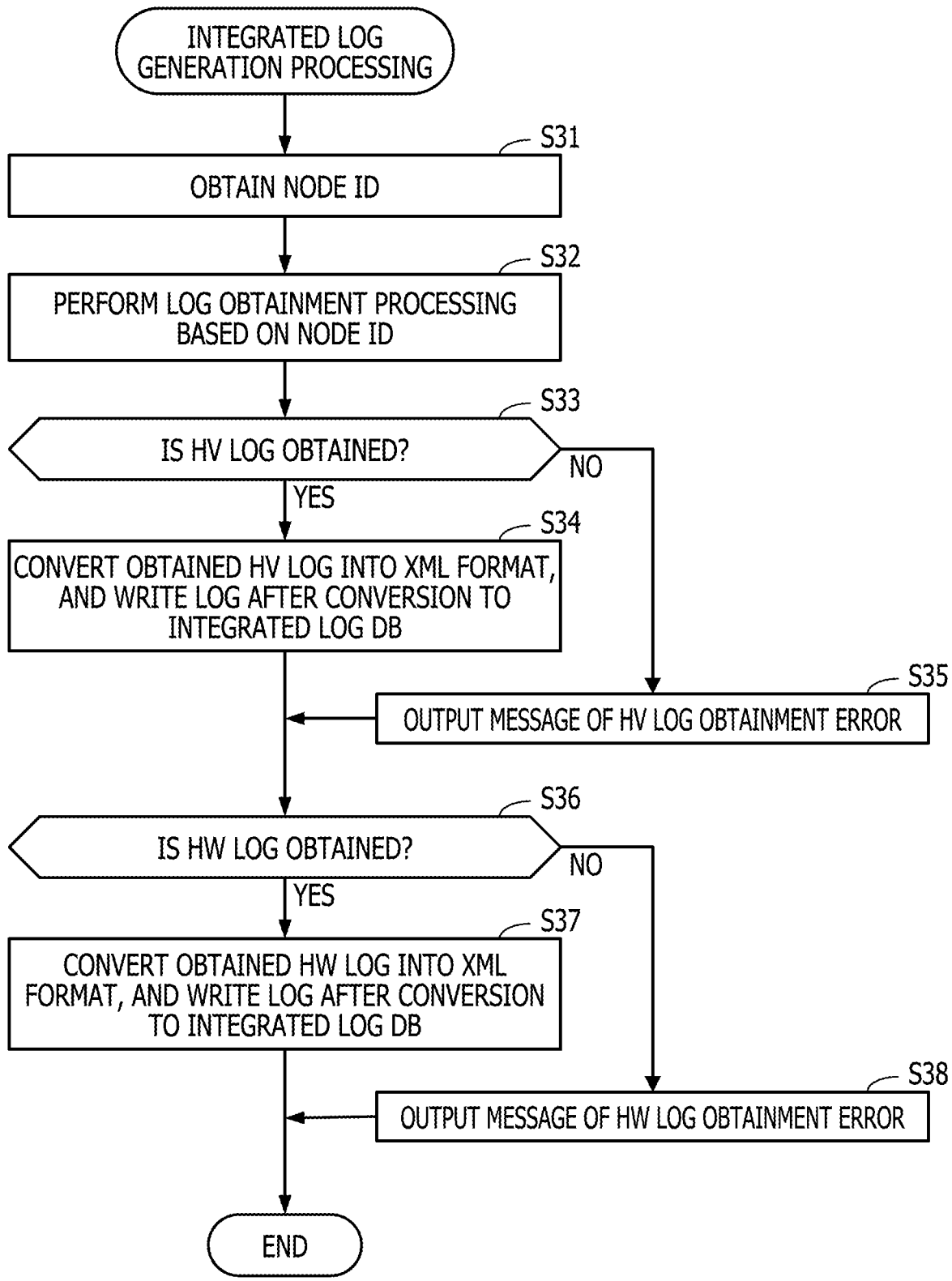
FIG. 16 is a flowchart illustrating an example of integrated log generation processing.

FIG. 16 is a flowchart illustrating an example of integrated log generation processing. The processing illustrated in FIG. 16 will be described in the following along step numbers.

(S31) When the integrated log generating unit 131 receives a request for the integrated log generation processing, the integrated log generating unit 131 obtains the node ID included in the request.

(S32) The integrated log generating unit 131 performs log obtainment processing regarding the hypervisor 210 and the hardware based on the obtained node ID. For example, the integrated log generating unit 131 identifies the IP address of the hypervisor 210 corresponding to the obtained node ID based on the node ID management table 112, and requests an HV log and the status of the hypervisor 210 from the hypervisor 210. In addition, the integrated log generating unit 131 identifies the IP address of the hardware related to the IP address of the hypervisor 210 from the IP address management table 111. The integrated log generating unit 131 requests an HW log of the hardware and the status of the hardware from the infrastructure managing unit 140 based on the identified IP address.

(S33) The integrated log generating unit 131 determines whether or not the HV log of the hypervisor 210 may be obtained. When the HV log may be obtained, the integrated log generating unit 131 advances the processing to step S34. When it is difficult to obtain the HV log, the integrated log generating unit 131 advances the processing to step S35.

(S34) The integrated log generating unit 131 converts the obtained HV log (CSV format) into the XML format, and writes the log after the conversion to the integrated log DB 150. Here, the integrated log generating unit 131 replaces the IP address and the account name included in the log file converted into the XML format with the node ID corresponding to the IP address and the account name, and then writes the log file to the integrated log DB 150. The integrated log generating unit 131 then advances the processing to step S36.

(S35) The integrated log generating unit 131 outputs a message of an HV log obtainment error. For example, the integrated log generating unit 131 notifies the message to the tenant managing unit 810, and makes the display of the client 800 display the contents of the message. The integrated log generating unit 131 then advances the processing to step S36.

(S36) The integrated log generating unit 131 determines whether or not the HW log may be obtained from the infrastructure managing unit 140. When the HW log may be obtained, the integrated log generating unit 131 advances the processing to step S37. When it is difficult to obtain the HW log, the integrated log generating unit 131 advances the processing to step S38.

(S37) The integrated log generating unit 131 converts the obtained HW log (JSON format) into the XML format, and writes the log after the conversion and the status obtained together with the log to the integrated log DB 150. Here, the integrated log generating unit 131 replaces the IP address and the account name included in the log file converted into the XML format with the node ID corresponding to the IP address and the account name, and then writes the log file to the integrated log DB 150. The integrated log generating unit 131 then ends the processing.

(S38) The integrated log generating unit 131 outputs a message of an HW log obtainment error. For example, the integrated log generating unit 131 notifies the message to the tenant managing unit 810, and makes the display of the client 800 display the contents of the message. The integrated log generating unit 131 then ends the processing.

Thus, the management server 100 obtains the integrated log by converting the log in a first data format (for example, the CSV format) regarding the hypervisor 210 and the log in a second data format (for example, the JSON format) regarding the hardware into the log in a third data format (for example, the XML format). In addition, in the integrated log, the management server 100 replaces setting information such as the IP addresses and the account names or the like in the environment with the node IDs.

A processing procedure of the integrated log DB 150 (DBMS) will next be described.

Figure 17:
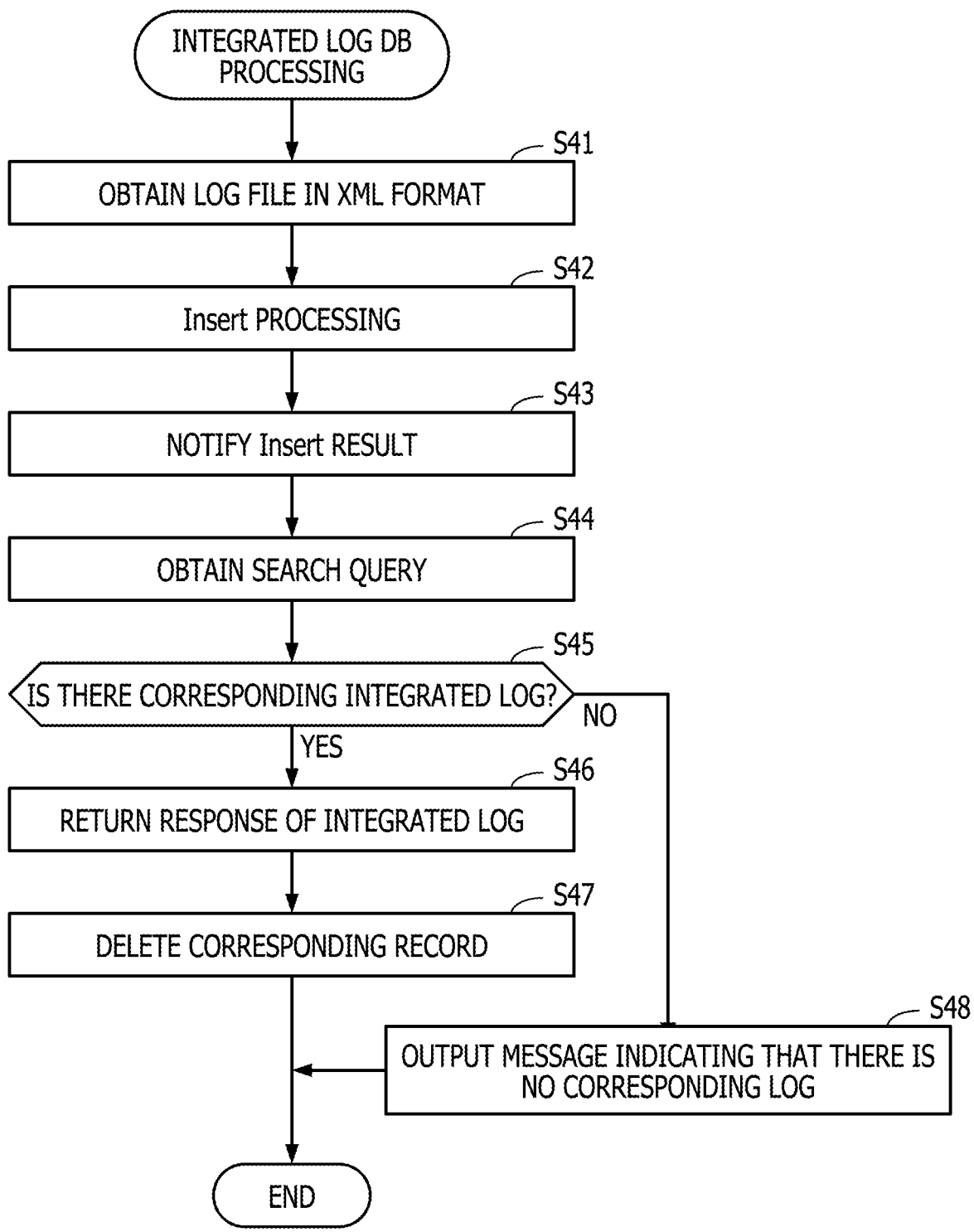
FIG. 17 is a flowchart illustrating an example of integrated log database (DB) processing.

FIG. 17 is a flowchart illustrating an example of integrated log DB processing. The processing illustrated in FIG. 17 will be described in the following along step numbers.

(S41) The integrated log DB 150 obtains the log file and the statuses in the XML format, the log file being generated by the integrated log generating unit 131. The log file includes the log file generated from the HV log and the log file generated from the HW log. In addition, the log file does not include the IP addresses and the account names (the IP addresses and the account names are already replaced with the node IDs).

(S42) The integrated log DB 150 performs Insert processing. For example, the integrated log DB 150 obtains the virtual machine name selected by the user 71 and the node ID of the hypervisor 210 identified for the virtual machine name from the integrated log generating unit 131. The integrated log DB 150 generates a record in which the log file and the statuses obtained in step S41 are associated with the virtual machine name, the node ID of the hypervisor 210, and a present date and time, and inserts the record into the integrated log management table 151.

(S43) The integrated log DB 150 notifies an Insert result to the tenant managing unit 810.

(S44) The integrated log DB 150 obtains an integrated log search query including the node ID of the hypervisor 210 from the tenant managing unit 810.

(S45) The integrated log DB 150 searches the integrated log management table 151 using the node ID included in the search query as a key, and determines whether or not there is a corresponding integrated log. When there is a corresponding integrated log, the integrated log DB 150 advances the processing to step S46. When there is no corresponding integrated log, the integrated log DB 150 advances the processing to step S48.

(S46) The integrated log DB 150 returns a response of the integrated log obtained by the search to the tenant managing unit 810.

(S47) The integrated log DB 150 deletes the record of the returned integrated log from the integrated log management table 151. The integrated log DB 150 then ends the processing.

(S48) The integrated log DB 150 outputs a message indicating that is no corresponding log. For example, the integrated log DB 150 notifies the message to the tenant managing unit 810, and makes the display of the client 800 display the contents of the message. The integrated log DB 150 then ends the processing.

Incidentally, in step S44, the integrated log DB 150 may receive a search query including the node ID of the hardware related to the hypervisor 210. In this case, the integrated log DB 150 retrieves, by a full-text retrieval, a log message including the node ID of the hardware from HW logs registered in the integrated log management table 151, and outputs the retrieved log message.

The integrated log is in a single format (XML format). Therefore, the tenant managing unit 810 may display the log of the hypervisor 210 and the log of the hardware (the VM executing server 200, the switch 400, and the storage 600 or the like) related to the hypervisor 210 in a single graphical user interface (GUI). The user 71 may check the logs of the hypervisor 210 and each piece of hardware in the single GUI provided by the tenant managing unit 810, and may thus efficiently analyze the logs in relation to a fault or the like.

Description will next be made of a sequence of a comparative example assuming a case where the management server 100 does not generate an integrated log. In a case where there are no functions of the integrated log generating unit 131 and the tenant managing unit 810, for example, a flow of log provision processing by the management server 100 is as follows.

Figure 18:
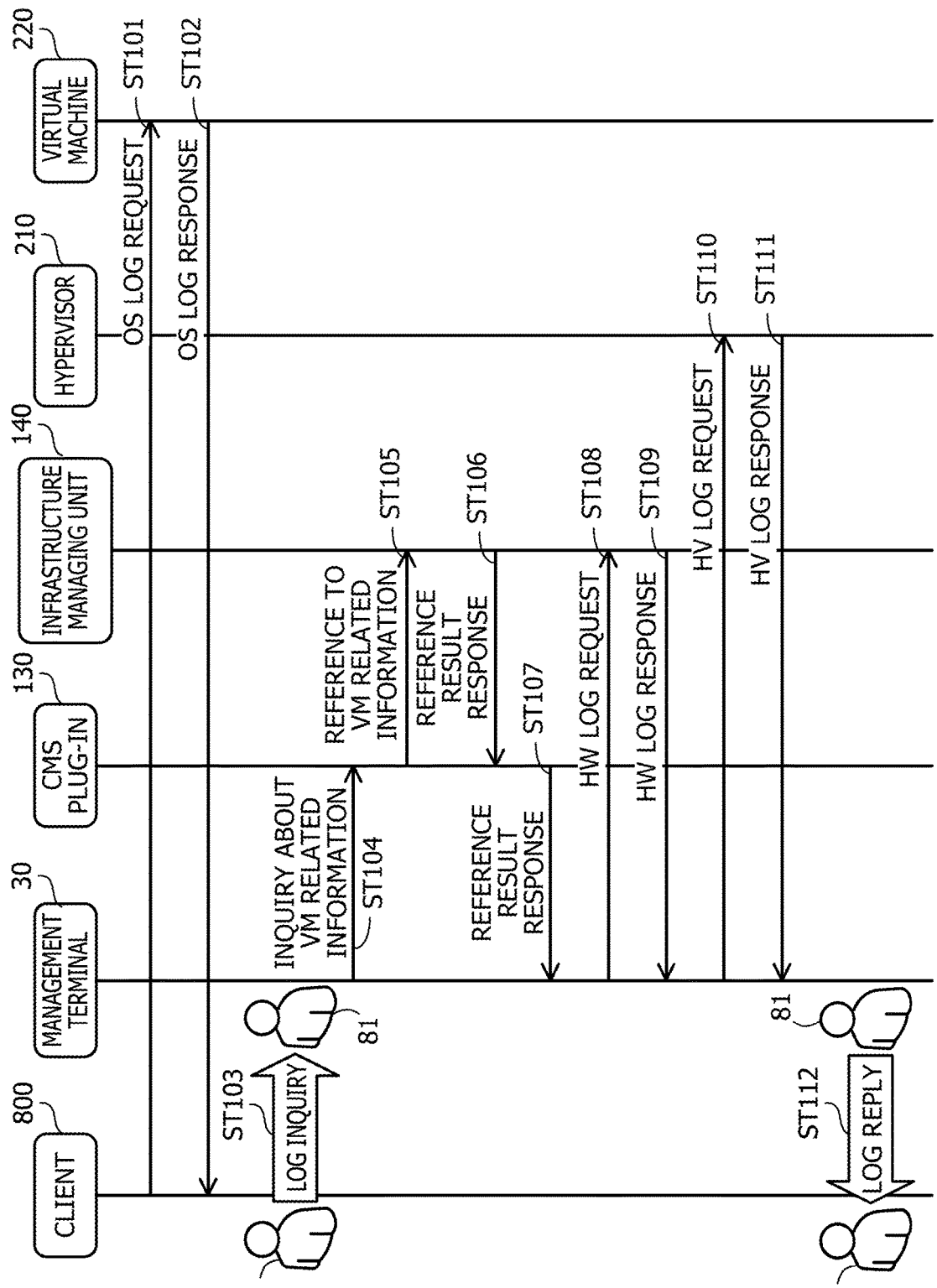
FIG. 18 is a sequence diagram illustrating a comparative example of log provision processing.

FIG. 18 is a sequence diagram illustrating a comparative example of log provision processing. The processing illustrated in FIG. 18 will be described in the following along step numbers.

(ST101) In response to occurrence of a fault, the client 800 requests an OS log of the virtual machine 220 selected by the user 71 from the virtual machine 220.

(ST102) In response to the request for the OS log, the virtual machine 220 returns a response of the OS log to the client 800. The client 800 displays the OS log of the virtual machine 220 on the display of the client 800.

(ST103) The user 71 inquires of the administrator 81 about a log for the fault. For example, the log inquiry is made by telephone, electronic mail, or the like. After checking the contents of the inquiry, the administrator 81 operates the management terminal 30, and starts to refer to logs of the hypervisor 210 and the hardware related to the virtual machine 220.

(ST104) The management terminal 30 requests the CMS plug-in 130 to make an inquiry about VM related information according to an instruction of the administrator 81. The inquiry about the VM related information is an inquiry about the node IDs and the IP addresses of the hypervisor 210 and the hardware related to the virtual machine 220.

(ST105) The CMS plug-in 130 requests the infrastructure managing unit 140 to make reference for the nodes (the hypervisor and the hardware) related to the virtual machine 220 (reference to the VM related information).

(ST106) The infrastructure managing unit 140 returns a response of a result of the reference to the node IDs and the IP addresses of the nodes in question to the CMS plug-in 130.

(ST107) The CMS plug-in 130 returns a response of the reference result obtained from the infrastructure managing unit 140 to the management terminal 30.

(ST108) The management terminal 30 requests an HW log from the infrastructure managing unit 140 based on the IP address of the hardware, the IP address being included in the reference result in step ST107.

(ST109) In response to the request for the HW log, the infrastructure managing unit 140 returns a response of the HW log of the hardware corresponding to the IP address to the management terminal 30. The management terminal 30 displays the contents of the HW log on a display of the management terminal 30.

(ST110) The management terminal 30 requests an HV log from the hypervisor 210 based on the IP address of the hypervisor 210, the IP address being included in the reference result in step ST107.

(ST111) In response to the request for the HV log, the hypervisor 210 returns a response of the HV log to the management terminal 30. The management terminal 30 displays the contents of the HV log on the display of the management terminal 30. In this case, the HV log and the HW log are in different file formats, and therefore the management terminal 30 displays the HV log using a GUI different from that of the HW log.

(ST112) The administrator 81 checks the HV log and the HW log displayed by the management terminal 30, and returns a reply of the contents of the HV log and the HW log to the user 71. For example, the reply is made by telephone, electronic mail, or the like.

Thus, the user 71 may check the contents of the HV log and the HW log via the administrator 81. However, when the user 71 checks the contents of the HV log and the HW log via the administrator 81, communication between the user 71 and the administrator 81 takes time, and thus there is a possibility of a delay in dealing with a fault when the fault occurs in the virtual machine 220. On the other hand, it is not desirable from a viewpoint of security to provide the user 71 with all of information in the environment within the information processing system. This is because the HV log the HW log, for example, include information that adversely affects the operation of the system when abused or misused by the external user 71, the information being IP addresses and account names or the like used within the system.

Accordingly, the management server 100 implements log management in which attention is directed to security rights of administrators, the security rights being layered in a multi-tenant environment. For example, information from which information related to security is excluded is set at a time of log viewing by the user, and thereby the user is allowed to view the HV log and the HW log via a GUI. For example, by a function of the integrated log generating unit 131, the management server 100 replaces specific information such as the IP addresses and the account names included in the HV log and the HW log with the node ID of the hypervisor 210 and the node ID of the hardware. As described earlier, the node IDs are not information used for control within the system. Doing harm to the system by using the node IDs thus does not occur. Therefore, it is possible to provide the client 800 with a part of the logs regarding the environment while securing safety on the system side (for example, while suppressing a leakage of the specific information).

In addition, the management server 100 creates the integrated log in the XML format. Thus, the logs of the hypervisor 210 and the hardware related to the virtual machine 220 may be checked in a unified format. For example, the user 71 may check the logs of the hypervisor 210 and each piece of hardware in a single GUI provided by the tenant managing unit 810, and may thus efficiently analyze the logs in relation to a fault or the like.

Further, while the hardware of the VM executing servers 200 and 300, the switches 400 and 500, and the storages 600 and 700 are mainly illustrated as hardware as targets for management by the management server 100, other hardware may be set as management targets. For example, the management server 100 may also provide the user with logs of other kinds of devices that may be used within the system, the other kinds of devices being a switch for SAN, the switch belonging to the SAN 60, a load balancer, and the like, after concealing the specific information.

Incidentally, the information processing of the first embodiment may be implemented by making the processing unit 1b execute a program. In addition, the information processing of the second embodiment may be implemented by making the processor 101 execute a program. The programs may be recorded on a computer readable recording medium 13.

As an example, the programs may be distributed by distributing the recording medium 13 on which the programs are recorded. In addition, the programs may be stored in another computer in advance, and the programs may be distributed via a network. A computer may, for example, store (install) the programs recorded on the recording medium 13 or the programs received from the other computer into a storage device such as the RAM 102, the HDD 103, or the like, read the programs from the storage device, and execute the programs.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A log management device comprising:
one or more memories configured to store management information indicating each relationship between identification information of each virtual machine and identification information regarding each environment in which the each virtual machine operates; and
one or more processor coupled to the one or memories and configured to
by referring to the management information, obtain a first log regarding a first environment operating a first virtual machine on the basis of identification information of the first virtual machine,
perform generation of a second log in which specific information included in the first log is changed to a specific identifier regarding the first environment, and
output the second log in response to receiving a request for a log regarding the first virtual machine.

2. The log management device according to claim 1, wherein
the identification information regarding the each environment includes at least one of an address of each hypervisor of the each virtual machine and an address of hardware related to each physical machine operating the each virtual machine.

3. The log management device according to claim 1, wherein
the specific information is setting information of the first environment.

4. The log management device according to claim 3, wherein the setting information includes first setting information regarding a hypervisor of the first virtual machine and second setting information regarding first hardware related to a physical machine operating the first virtual machine, and
wherein the generation includes changing the first setting information in the specific information to a first identifier of the hypervisor, and changing the second setting information in the specific information to a second identifier of the first hardware.

5. The log management device according to claim 4, wherein
the first setting information includes at least one of an address of the hypervisor and account information used for access to the hypervisor, and the second setting information includes at least one of an address of the hardware and account information used for access to the hardware.

6. The log management device according to claim 4, wherein
the processor is configured to generate the first log by converting a log in a first data format regarding the hypervisor and a log in a second data format regarding the first hardware into logs in a third data format.

7. The log management device according to claim 1, wherein
the specific identifier regarding the first environment includes at least one of a first identifier of a hypervisor of the first virtual machine and a second identifier of first hardware related to a physical machine operating the first virtual machine.

8. The log management device according to claim 7, wherein
the processor is configured to
obtain the first node identifier from the hypervisor, and store the first node identifier in association with an address of the hypervisor in the one or more memories, and
obtain the second node identifier from the first hardware, and store the second node identifier in association with an address of the first hardware in the one or more memories.

9. The log management device according to claim 1, wherein the processor is configured to transmit the specific identifier regarding the first environment to a terminal when the identification information of the first virtual machine is designated by the terminal, and
wherein the request which is received from the terminal includes the specific identifier.

10. A log management method executed by a computer, the log management method comprising:
obtaining a first log regarding a first environment operating a first virtual machine on the basis of identification information of the first virtual machine by referring to management information indicating each relationship between identification information of each virtual machine and identification information regarding each environment in which the each virtual machine operates;
generating a second log in which specific information included in the first log is changed to a specific identifier regarding the first environment; and
outputting the second log in response to receiving a request for a log regarding the first virtual machine.

11. The log management method according to claim 10, wherein
the identification information regarding the each environment includes at least one of an address of each hypervisor of the each virtual machine and an address of hardware related to each physical machine operating the each virtual machine.

12. The log management method according to claim 10, wherein
the specific information is setting information of the first environment.

13. The log management method according to claim 12, wherein the setting information includes first setting information regarding a hypervisor of the first virtual machine and second setting information regarding first hardware related to a physical machine operating the first virtual machine, and wherein the generating includes changing the first setting information in the specific information to a first identifier of the hypervisor, and changing the second setting information in the specific information to a second identifier of the first hardware.

14. The log management method according to claim 13, wherein
the first setting information includes at least one of an address of the hypervisor and account information used for access to the hypervisor, and
the second setting information includes at least one of an address of the hardware and account information used for access to the hardware.

15. The log management device according to claim 13, further comprising: generating the first log by converting a log in a first data format regarding the hypervisor and a log in a second data format regarding the first hardware into logs in a third data format.

16. The log management method according to claim 10, wherein
the specific identifier regarding the first environment includes at least one of a first identifier of a hypervisor of the first virtual machine and a second identifier of first hardware related to a physical machine operating the first virtual machine.

17. The log management method according to claim 16, further comprising:
obtaining the first node identifier from the hypervisor, and storing the first node identifier in association with an address of the hypervisor, and
obtaining the second node identifier from the first hardware, and storing the second node identifier in association with an address of the first hardware.

18. The log management method according to claim 10, further comprising: transmitting the specific identifier regarding the first environment to a terminal when the identification information of the first virtual machine is designated by the terminal,
wherein the request which is received from the terminal includes the specific identifier.

19. A non-transitory computer-readable medium storing log management program instructions executable by one or more computer, the log management program instructions comprising:
one or more instructions for obtaining a first log regarding a first environment operating a first virtual machine on the basis of identification information of the first virtual machine by referring to management information indicating each relationship between identification information of each virtual machine and identification information regarding each environment in which the each virtual machine operates;
one or more instructions for generating a second log in which specific information included in the first log is changed to a specific identifier regarding the first environment; and
one or more instructions for outputting the second log in response to receiving a request for a log regarding the first virtual machine.

* * * * *